(12) United States Patent
Tsujimoto

(10) Patent No.: US 12,057,150 B2
(45) Date of Patent: Aug. 6, 2024

(54) MAGNETIC TAPE, MAGNETIC TAPE CARTRIDGE, AND MAGNETIC TAPE DEVICE

(71) Applicant: FUJIFILM Corporation, Tokyo (JP)

(72) Inventor: Shinji Tsujimoto, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/161,284

(22) Filed: Jan. 30, 2023

(65) Prior Publication Data

US 2023/0169996 A1 Jun. 1, 2023

Related U.S. Application Data

(63) Continuation of application No. PCT/JP2021/028013, filed on Jul. 29, 2021.

(30) Foreign Application Priority Data

Jul. 31, 2020 (JP) .................................. 2020-130864

(51) Int. Cl.
*G11B 5/72* (2006.01)

(52) U.S. Cl.
CPC ..................................... *G11B 5/72* (2013.01)

(58) Field of Classification Search
CPC ..... G11B 5/70; G11B 5/70678; G11B 5/7085; G11B 5/71; G11B 5/712; G11B 5/714;
(Continued)

(56) References Cited

U.S. PATENT DOCUMENTS 6,703,101 B2 * 3/2004 Yamazaki .......... G11B 5/70678
428/141
2001/0028963 A1 * 10/2001 Naoe ..................... G11B 5/708
(Continued)

FOREIGN PATENT DOCUMENTS

JP 2002-367142 A 12/2002
JP 2017-45501 A 3/2017
(Continued)

OTHER PUBLICATIONS

English Machine Translation: Sasaki et al. (JP 62-022239) (Year: 1987).*

(Continued)

*Primary Examiner* — Holly Rickman
*Assistant Examiner* — Linda N Chau
(74) *Attorney, Agent, or Firm* — Sughrue Mion, PLLC

(57) ABSTRACT

The magnetic tape has one or more of each of an area A and an area B having different center line average surface roughness Ra measured on a surface of a magnetic layer in a region over a part of the magnetic tape in a longitudinal direction, with a ratio $B_{Mag}/A_{Mag}$ of 1.20 to 10.00 and a ratio $B_{Mag}/B_{Back}$ of equal to or greater than 2.0 in a case where extraction amounts per unit area of a component selected from the group consisting of fatty acid, fatty acid ester, and fatty acid amide extracted from a magnetic layer side of the area A and the area B are defined as $A_{Mag}$ and $B_{Mag}$ respectively, and an extraction amount per unit area of the above component extracted from a back coating layer side of the area B is defined as $B_{Back}$.

16 Claims, 2 Drawing Sheets

(58) Field of Classification Search
CPC .. G11B 5/735; G11B 5/78; G11B 5/84; G11B 5/00813; G11B 5/702; G11B 5/70615; G11B 5/733; G11B 5/7334
See application file for complete search history.

(56) References Cited

U.S. PATENT DOCUMENTS

| | | | |
|---|---|---|---|
| 2003/0054204 A1* | 3/2003 | Kasuga | G11B 5/716 |
| 2018/0240491 A1 | 8/2018 | Ozawa et al. | |
| 2019/0027175 A1 | 1/2019 | Kurokawa et al. | |

FOREIGN PATENT DOCUMENTS

| | | |
|---|---|---|
| JP | 2017-45502 A | 3/2017 |
| JP | 2018-137014 A | 8/2018 |
| JP | 2019-21364 A | 2/2019 |

OTHER PUBLICATIONS

English Machine Translation: Saito (JP 08-221737 A) (Year: 1996).*
International Search Report dated Oct. 26, 2021 issued by the International Searching Authority in Application No. PCT/JP2021/028013.
Written Opinion dated Oct. 26, 2021 issued by the International Searching Authority in Application No. PCT/JP2021/028013.
International Preliminary Report on Patentability dated Jan. 31, 2023 with a Translation of the Written Opinion of the International Searching Authority in Application No. PCT/JP2021/028013.

* cited by examiner

MT

MAGNETIC TAPE, MAGNETIC TAPE CARTRIDGE, AND MAGNETIC TAPE DEVICE

CROSS-REFERENCE TO RELATED APPLICATIONS

This application is a Continuation of PCT International Application No. PCT/JP2021/028013 filed on Jul. 29, 2021, which claims priority under 35 U.S.C. § 119(a) to Japanese Patent Application No. 2020-130864 filed on Jul. 31, 2020. Each of the above applications is hereby expressly incorporated by reference, in its entirety, into the present application.

BACKGROUND OF THE INVENTION

1. Field of the Invention

The present invention relates to a magnetic tape, a magnetic tape cartridge, and a magnetic tape device.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up or archives (for example, see JP2002-367142A).

SUMMARY OF THE INVENTION

A magnetic tape is required to exhibit excellent electromagnetic conversion characteristics.

Meanwhile, in recent years, a magnetic tape used for data storage is used in a data center in which a temperature is managed. Meanwhile, in the data center, power saving is necessary for reducing the cost. For realizing the power saving, the management conditions of the temperature of the data center can be alleviated compared to the current state, or the managing may not be necessary. However, it is assumed that, in a case where the temperature management conditions are relaxed or not managed, the magnetic tape is exposed to a high temperature.

Regarding the above point, according to the studies by the present inventors, it is clear that, in a high temperature environment (for example, in a severe high temperature environment of 60° C. or higher), in a case where data is record on the magnetic tape and/or data recorded on the magnetic tape is reproduced by repeatedly running the magnetic tape, the electromagnetic conversion characteristics tend to easily deteriorate.

According to an aspect of the present invention, an object is to provide a magnetic tape having less deterioration in electromagnetic conversion characteristics even after repeated running in a high temperature environment.

According to an aspect of the invention, there is provided a magnetic tape comprising: a non-magnetic support; a magnetic layer including a ferromagnetic powder; a back coating layer containing a non-magnetic powder on a surface side of the non-magnetic support opposite to a surface side including the magnetic layer, in which a region over a part of the magnetic tape in a longitudinal direction includes one or more areas A, a region over the other part of the magnetic tape includes one or more areas B, the area A is a region in which a center line average surface roughness Ra measured on a surface of the magnetic layer is less than 2.5 nm, the area B is a region in which the center line average surface roughness Ra measured on the surface of the magnetic layer is 2.5 nm to 10.0 nm, in a case where extraction amounts per unit area of a component selected from the group consisting of fatty acid, fatty acid ester, and fatty acid amide extracted from a magnetic layer side of the area A and the area B are defined as $A_{Mag}$ and $B_{Mag}$, respectively, a ratio $B_{Mag}/A_{Mag}$ is 1.20 to 10.00, and in a case where an extraction amount per unit area of a component selected from the group consisting of fatty acid, fatty acid ester, and fatty acid amide extracted from a back coating layer side of the area B is defined as $B_{Back}$, a ratio $B_{Mag}/B_{Back}$ is equal to or greater than 2.0.

In one embodiment, the ratio $B_{Mag}/A_{Mag}$ may be 1.80 to 5.00.

In one embodiment, the ratio $B_{Mag}/B_{Back}$ may be equal to or greater than 7.0.

In one embodiment, a steel ball wear volume of the area B measured on the surface of the magnetic layer may be $1\times10^{-7}$ mm$^3$ to $1\times10^{-4}$ mm$^3$.

In one embodiment, in a case where an area of the area A is defined as $S_A$ and an area of the area B is defined as $S_B$, a ratio $(S_B/(S_A+S_B))\times100$ of $S_B$ to a total of $S_A$ and $S_B$ may be 0.15% to 50.00%. Hereinafter, the ratio is also referred to as an "area ratio of the area B".

In one embodiment, in the magnetic tape, two or more areas B may be included.

In one embodiment, the magnetic tape may further include a non-magnetic layer containing a non-magnetic powder between the non-magnetic support and the magnetic layer.

In one embodiment, in the magnetic tape, a servo pattern may be provided on at least a part of the magnetic layer.

In one embodiment, in the magnetic tape, the servo pattern may be provided at least on the magnetic layer of the area A.

In one embodiment, in the magnetic tape, the servo pattern may be further provided on the magnetic layer of the area B.

According to another aspect of the invention, there is provided a magnetic tape cartridge comprising the magnetic tape described above.

According to still another aspect of the invention, there is provided a magnetic tape device comprising the magnetic tape and a magnetic head.

In one embodiment, a region where the magnetic head records data may be included in at least the area A.

In one embodiment, the magnetic tape device may control running conditions of the area B according to a measurement result regarding recording and reproducing quality of data in the area A.

According to one aspect of the present invention, it is possible to provide a magnetic tape having less deterioration in electromagnetic conversion characteristics even after repeated running in the high temperature environment, and a magnetic tape cartridge and a magnetic tape device including the magnetic tape.

DESCRIPTION OF THE PREFERRED EMBODIMENTS

[Magnetic Tape]

Figure 1:
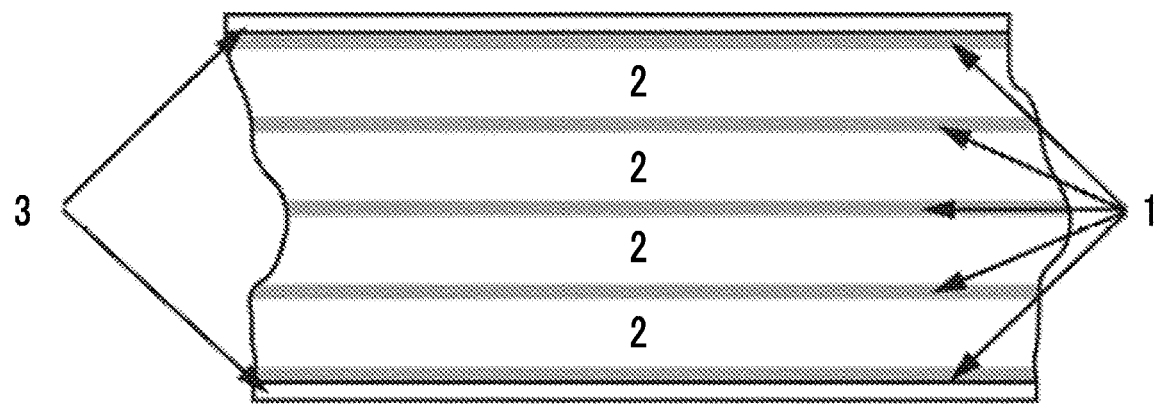
FIG. 1 shows an example of disposition of data bands and servo bands.

One aspect relates to a magnetic tape including a non-magnetic support, a magnetic layer including a ferromagnetic powder, and a back coating layer containing a non-magnetic powder on a surface side of the non-magnetic support opposite to a surface side including the magnetic layer. In the magnetic tape, a region over a part of the magnetic tape in a longitudinal direction includes one or more areas A and a region over the other part of the magnetic tape includes one or more areas B. The area A is a region in which a center line average surface roughness Ra measured on the surface of the magnetic layer is less than 2.5 nm and the area B is a region in which the center line average surface roughness Ra measured on the surface of the magnetic layer is 2.5 nm to 10.0 nm. In a case where extraction amounts per unit area of a component selected from the group consisting of fatty acid, fatty acid ester, and fatty acid amide extracted from the magnetic layer side of the area A and the area B are defined as $A_{Mag}$ and $B_{Mag}$, respectively, a ratio $B_{Mag}/A_{Mag}$ is 1.20 to 10.00, and in a case where an extraction amount per unit area of a component selected from the group consisting of fatty acid, fatty acid ester, and fatty acid amide extracted from the back coating layer side of the area B is defined as $B_{Back}$, a ratio $B_{Mag}/B_{Back}$ is equal to or greater than 2.0. In addition, "Mag" is an abbreviation for a magnetic layer, and "Back" is an abbreviation for a back coating layer.

In the invention and the specification, the center line average surface roughness Ra measured on the surface of the magnetic layer is a value measured in a region having an area of 40 μm×40 μm randomly selected from the surface of the magnetic layer with an atomic force microscope (AFM). The center line average surface roughness Ra measured on the surface of the non-magnetic support which will be described later is also set as a value measured in the same manner regarding the surface of the non-magnetic support.

The following measurement conditions can be used as an example of the measurement conditions. The center line average surface roughness Ra shown in Examples which will be described later is a value obtained by measurement under the following measurement conditions.

The measurement regarding a region of the surface of the magnetic layer of the magnetic tape having an area of 40 μm×40 μm is performed with an AFM (Nanoscope 4 manufactured by Veeco Instruments, Inc.) in a tapping mode. RTESP-300 manufactured by BRUKER is used as a probe, a resolution is set as 512 pixels×512 pixels, and a scan speed is set by the measurement regarding 1 screen (512 pixels× 512 pixels) for 341 seconds.

Hereinafter, the center line average surface roughness Ra of the area A measured on the surface of the magnetic layer is also referred to as "the magnetic layer surface Ra of the area A", and the center line average surface roughness Ra of the area B measured on the surface of the magnetic layer is also referred to as "the magnetic layer surface Ra of the area B". In a case where the magnetic tape includes two or more areas A, the magnetic layer surface Ra of the areas A can have the same value in one aspect and can have different values in another aspect. The same applies for the magnetic layer surface Ra of the area B. In the invention and the specification, the "surface of the magnetic layer" of the magnetic tape is identical to a surface of the magnetic tape on the magnetic layer side.

In the present invention and the present specification, the extraction amount $A_{MAG}$ per unit area of the component selected from the group consisting of fatty acid, fatty acid ester, and fatty acid amide extracted from the magnetic layer side of the area A is a value obtained by the following method. Hereinafter, the component selected from the group consisting of fatty acid, fatty acid ester, and fatty acid amide is also referred to as a "lubricant", and the extraction amount per unit area of such a component is also referred to as a "lubricant extraction amount".

A tape sample having a length of 5 cm is cut out from a random position of the area A in the longitudinal direction. Before or after cutting, the back coating layer is removed by a well-known method. The tape sample after removing the back coating layer is immersed in 30 ml of methanol at a liquid temperature of 60° C. for 3 hours. The component thus extracted into the methanol from the tape sample is subjected to qualitative analysis and quantitative analysis by a gas chromatograph method after evaporating a part or the whole of the methanol as necessary. From the analysis result thus obtained, the extraction amount of the component selected from the group consisting of fatty acid, fatty acid ester, and fatty acid amide extracted from the tape sample is obtained. The obtained extraction amount is divided by an area of one surface of the tape sample to calculate the extraction amount $A_{Mag}$ per unit area. The area of one surface of the tape sample is a value calculated as a "length×width of the tape sample". A tape width of the magnetic tape is defined in the standard of the magnetic tape device (generally referred to as a "drive") to which the magnetic tape is applied. For example, the tape width defined in the standard is ½ inch, and ½ inch=0.0127 μm. As the width of the tape sample, the tape width specified in the standard for the magnetic tape from which the tape sample is cut can be adopted.

The area A is a region in which a center line average surface roughness Ra measured on the surface of the magnetic layer is less than 2.5 nm. In a case where the number of areas A included in the magnetic tape to be measured is one, tape samples are cut out from two different positions in the areas A, and regarding these two tape samples, an arithmetic mean of the extraction amounts $A_{Mag}$ per unit area obtained by the method is set as $A_{Mag}$ of the area A of the magnetic tape to be measured. In a case where the number of areas A included in the magnetic tape to be measured is two or more, tape samples are cut out from two different positions in the areas A for each area A, and regarding these two tape samples, the extraction amount $A_{Mag}$ per unit area is obtained by the method described above. Accordingly, two calculated values are obtained for one area A. The arithmetic mean of the calculated values obtained for all the areas A is defined as the $A_{Mag}$ of the area A of the magnetic tape to be measured.

However, in a case where a magnetic tape from which a tape piece serving as the area A is cut out (hereinafter, referred to as a "magnetic tape for the area A") is available, a value obtained by using a tape sample cut out from the magnetic tape for the area A can be used as various physical properties values ($A_{Mag}$, the magnetic layer surface Ra of the area A, and the like) regarding the area A of the magnetic tape to be measured. In addition, in a case where the magnetic tape including the plurality of areas A is manufactured by using the plurality of tape pieces cut out from the same magnetic tape for the area A, in a case where the magnetic tape for the area A is available, a value obtained by using the tape sample cut out from the magnetic tape for the area A can be used as the various physical properties values ($A_{Mag}$, the magnetic layer surface Ra of the area A, an anisotropic magnetic field Hk, and the like) regarding the area A of the magnetic tape to be measured as described above, and the value thus obtained can be used as the various physical properties values of each of the plurality areas A. In this case, various physical properties values can be obtained in the same manner as in the case where the number of areas A included in the magnetic tape is one. That is, for example, for $A_{Mag}$, two tape samples are cut out from the magnetic tape for the area A, and regarding these two tape samples, an arithmetic mean of the extraction amounts $A_{Mag}$ per unit area obtained by the method can be set as $A_{Mag}$ of the area A of the magnetic tape to be measured.

In the present invention and the present specification, the extraction amount $B_{MAG}$ per unit area of the component selected from the group consisting of fatty acid, fatty acid ester, and fatty acid amide extracted from the magnetic layer side of the area B is a value obtained by the following method.

A tape sample having a length of 5 cm is cut out from a random position of the area B in the longitudinal direction. For this tape sample, the measurement and calculation are performed by the same method as the method for obtaining the extraction amount $A_{Mag}$, and the extraction amount $B_{Mag}$ per unit area is calculated.

The area B is a region in which the center line average surface roughness Ra measured on the surface of the magnetic layer is 2.5 nm to 10.0 nm. In a case where the number of areas B included in the magnetic tape to be measured is one, tape samples are cut out from two different positions in the areas B, and regarding these two tape samples, an arithmetic mean of the extraction amounts $B_{Mag}$ per unit area obtained by the method is set as $B_{Mag}$ of the area B of the magnetic tape to be measured. In a case where the number of areas B included in the magnetic tape to be measured is two or more, tape samples are cut out from two different positions in the areas B for each area B, and regarding these two tape samples, the extraction amount $B_{Mag}$ per unit area is obtained by the method described above. Accordingly, two calculated values are obtained for one area B. The arithmetic mean of the calculated values obtained for all the areas B is defined as the $B_{Mag}$ of the area B of the magnetic tape to be measured.

However, in a case where a magnetic tape from which a tape piece serving as the area B is cut out (hereinafter, referred to as a "magnetic tape for the area B") is available, a value obtained by using a tape sample cut out from the magnetic tape for the area B can be used as various physical properties values ($B_{Mag}$, $B_{Back}$, the magnetic layer surface Ra of the area B, a steel ball wear volume of the area B measured on the surface of the magnetic layer, the anisotropic magnetic field Hk, and the like) regarding the area B of the magnetic tape to be measured. In addition, in a case where the magnetic tape including the plurality of areas B is manufactured by using the plurality of tape pieces cut out from the same magnetic tape for the area B, in a case where the magnetic tape for the area B is available, a value obtained by using the tape sample cut out from the magnetic tape for the area B can be used as the various physical properties values ($B_{Mag}$, $B_{Back}$, the magnetic layer surface Ra of the area B, the steel ball wear volume of the area B measured on the surface of the magnetic layer, the anisotropic magnetic field Hk, and the like) regarding the area B of the magnetic tape to be measured as described above, and the value thus obtained can be used as the various physical properties values of each of the plurality areas B. In this case, various physical properties values can be obtained in the same manner as in the case where the number of areas B included in the magnetic tape is one. That is, for example, for $B_{Mag}$, two tape samples are cut out from the magnetic tape for the area B, and regarding these two tape samples, an arithmetic mean of the extraction amounts $B_{Mag}$ per unit area obtained by the method can be set as $B_{Mag}$ of the area B of the magnetic tape to be measured.

In the present invention and the present specification, the extraction amount $B_{bacl}$ per unit area of the component selected from the group consisting of fatty acid, fatty acid ester, and fatty acid amide extracted from the back coating layer side of the area B is a value obtained by the following method.

A tape sample having a length of 5 cm is cut out from a random position of the area B in the longitudinal direction (herein, a position different from the position from which the tape sample for obtaining $B_{Mag}$ is cut out). For this tape sample, the measurement and calculation are performed by the same method as the method for obtaining the extraction amount $A_{Mag}$ except that the back coating layer is not removed, and the extraction amount per unit area is obtained. The extraction amount per unit area obtained here is expressed as $B_{Total}$.

In a case where the number of areas B included in the magnetic tape to be measured is one, tape samples are cut out from two different positions in the areas B, and regarding these two tape samples, an arithmetic mean of the extraction amounts $B_{Total}$ per unit area obtained by the method is set as $B_{Total}$ of the area B of the magnetic tape to be measured. In a case where the number of areas B included in the magnetic tape to be measured is two or more, tape samples are cut out from two different positions in the areas B for each area B, and regarding these two tape samples, the extraction amount $B_{Total}$ per unit area is obtained by the method described above. Accordingly, two calculated values are obtained for one area B. The arithmetic mean of the calculated values obtained for all the areas B is defined as the $B_{Total}$ of the area B of the magnetic tape to be measured.

The $B_{Back}$ of the magnetic tape to be measured is a value calculated as "$B_{Total} - B_{Mag}$" from the $B_{Total}$ thus obtained for the magnetic tape to be measured and the $B_{Mag}$ obtained for the magnetic tape to be measured as described above.

The magnetic tape includes the area A and the area B. The present inventors consider that this can contribute to suppression of a deterioration in electromagnetic conversion characteristics even when the running of the magnetic tape is repeated in a high temperature environment. This will be described in detail below.

The recording of data on the magnetic tape and the reproducing of the recorded data are performed by bringing the surface of the magnetic layer into contact with the magnetic head and sliding. It is considered that, in this sliding, the component selected from the group consisting of fatty acid, fatty acid ester, and fatty acid amide functions as a lubricant to contribute to suppression of occurrence of stick slip between the magnetic head and the surface of the magnetic layer. However, it is considered that, in the high temperature environment, particularly, in the severe high temperature environment of 60° C. or higher, the lubricant of the surface of the magnetic layer is depleted due to the sliding with the magnetic head and/or the exposure to the high temperature environment, and the stick slip may occur between the magnetic head and the surface of the magnetic layer. It is assumed that the occurrence of a spacing change due to this stick slip is a reason of a deterioration in the electromagnetic conversion characteristics in the repeated running in the high temperature environment. The inventors consider that the recording to a deep portion of the magnetic layer becoming difficult due to the occurrence of the spacing change may be a reason for the deterioration in the electromagnetic conversion characteristics.

However, it is considered that, in a case where the amount of the lubricant in the magnetic layer is increased over the entire magnetic tape, instead of partially providing a region containing a large amount of the lubricant as in the magnetic tape, durability is deteriorated due to plasticization of the magnetic layer and/or a surface shape of the back coating layer is easily transferred to the surface of the magnetic layer, thereby deteriorating the electromagnetic conversion characteristics.

On the other hand, the magnetic tape includes the area B containing a larger amount of lubricant than that in the area A, in addition to the area A. Accordingly, the inventors surmise that the lubricant can be supplied to the magnetic head by the sliding with the surface of the magnetic layer of the area B, and as a result, the deterioration in the electromagnetic conversion characteristics can be suppressed during the repeated running in the high temperature environment.

However, the above includes the surmise of the present inventors. The invention is not limited to other surmises described in this specification.

Hereinafter, the magnetic tape will be described more specifically.

<Ratio $B_{Mag}/A_{Mag}$>

In the magnetic tape, a ratio $B_{Mag}/A_{Mag}$ is 1.20 to 10.00. In the magnetic tape, in a case where the ratio $B_{Mag}/A_{Mag}$ is 1.20 or more, the lubricant can be appropriately supplied from the area B containing a large amount of the lubricant to the magnetic head during the sliding between the surface of the magnetic layer and the magnetic head, and as a result, it is assumed that the depletion of the lubricant is less likely to occur even in a severe high temperature environment. It is considered that this contributes to the suppression of the deterioration in the electromagnetic conversion characteristics in the repeated running in the high temperature environment. From the above viewpoint, the ratio $B_{Mag}/A_{Mag}$ is 1.20 or more, preferably 1.40 or more, more preferably 1.60 or more, and still more preferably 1.80 or more.

On the other hand, in the magnetic tape, in a case where the ratio $B_{Mag}/A_{Mag}$ is 10.00 or less, it is assumed that it is possible to suppress the formation of meniscus of the lubricant between the magnetic tape and the magnetic head. It is considered that this contributes to the suppression of the occurrence of stick slip and/or the occurrence of sticking to the magnetic head. From the above viewpoint, the ratio $B_{Mag}/A_{Mag}$ is 10.00 or less, preferably 9.00 or less, more preferably 8.00 or less, even more preferably 7.00 or less, still preferably 6.00 or less, and still more preferably 5.00 or less.

<Ratio $B_{Mag}/B_{Back}$>

In the magnetic tape, the ratio $B_{Mag}/B_{Back}$ in the area B is 2.0 or more, preferably 3.0 or more, even more preferably 4.0 or more, still preferably 5.0 or more, still more preferably 6.0 or more, and still even more preferably 7.0 or more.

The present inventors surmise that the ratio $B_{Mag}/B_{Back}$ in the area B in the range described above can contribute to the suppression of the deterioration in the electromagnetic conversion characteristics during the repeated running in the high temperature environment as described below.

In a state where the magnetic tape is wound around a reel, the surface of the magnetic layer is in contact with the surface of the back coating layer. Since the component (lubricant) selected from the group consisting of fatty acid, fatty acid ester, and fatty acid amide is generally a component having a low molecular weight, the component can move between the magnetic layer and the back coating layer in a state where the surface of the magnetic layer is in contact with the surface of the back coating layer. However, it is surmised that, in the area B in which the ratio $B_{Mag}/B_{Back}$ is 2.0 or more, the movement of the lubricant from the magnetic layer side to the back coating layer side can be suppressed or a movement amount can be reduced. As a result, it is considered that, the lubricant on the magnetic layer side of the area B can be abundantly provided, and as a result, an increase in ability to supply the lubricant from the magnetic layer side of the area B to the magnetic head can suppress the deterioration in the electromagnetic conversion characteristics during the repeated running in the high temperature environment.

The ratio $B_{Mag}/B_{Back}$ can be, for example, 40.0 or less, 35.0 or less, 30.0 or less, or 25.0 or less, and can also exceed the values exemplified here. As described above, it is preferable that the value of the ratio $B_{Mag}/B_{Back}$ is large from a viewpoint of suppressing the deterioration in the electromagnetic conversion characteristics during the repeated running in the high temperature environment.

<Area Ratio of Area B>

In the magnetic tape, in a case where the area of the area A is defined as $S_A$ and the area of the area B is defined as $S_B$, a ratio of $S_B$ to a total of $S_A$ and $S_B$ (the area ratio of the area B) is calculated as "$(S_B/(S_A+S_B))\times 100$". In a case where the magnetic tape includes two or more areas A, the area $S_A$ of the area A is a total of the areas of the two or more areas A. Also, for the area B, in a case where the magnetic tape includes two or more areas B, the area $S_B$ of the area B is a total of the areas of the two or more areas B. The area ratio of the area B is preferably 0.10% or more, and more preferably 0.15% or more. In addition, the area ratio of the area B is preferably 60.00% or less, more preferably 55.00% or less, and still more preferably 50.00% or less. It is preferable that the area ratio of the area B is in the range described above from a viewpoint of supplying an appropriate amount of the lubricant to the magnetic head during the sliding.

Hereinafter, the area A and the area B will be further described.

<Area A>

In the magnetic tape in which the center line average surface roughness Ra measured on the surface of the magnetic layer is less than 2.5 nm, the area A satisfies the ratio $B_{Mag}/A_{Mag}$ in which the $A_{Mag}$ obtained for the area A by the method described above is 1.20 to 10.00. In the magnetic tape, the area A is a region in which the value of the center line average surface roughness Ra measured on the surface of the magnetic layer is smaller (that is, a magnetic layer surface smoothness is higher) than that in the area B, and can be a region in which the extraction amount of the lubricant from the magnetic layer side is small.

The center line average surface roughness Ra (magnetic layer surface Ra) of the area A measured on the surface of the magnetic layer is less than 2.5 nm. Since the area A is a region which can be a data recording region as will be described later, it is preferable that the smoothness of the surface of the magnetic layer of the area A is high, from a viewpoint of improving the electromagnetic conversion characteristics. From this viewpoint, the magnetic layer surface Ra of the area A is preferably 2.4 nm or less, more preferably 2.3 nm or less, even more preferably 2.2 nm or less, still preferably 2.1 nm or less, and still more preferably 2.0 nm or less. The magnetic layer surface Ra of the area B can be, for example, 1.2 nm or more, 1.3 nm or more, or 1.4 nm or more, or can be less than the value exemplified here.

The magnetic layer surface Ra of the area A can be controlled by a well-known method. For example, the magnetic layer surface Ra of the area A can be controlled by a surface shape (for example, the center line average surface roughness Ra) of the surface of the non-magnetic support on a side where the magnetic layer is provided, a particle size of powder used as the component of the magnetic layer of the area A, and the like. The same applies for the magnetic layer surface Ra of the area B.

The $A_{Mag}$ obtained for the magnetic tape by the method described above is not particularly limited as long as the ratio $B_{Mag}/A_{Mag}$ is in the range described above. In one embodiment, such $A_{Mag}$ can be 20.0 mg/m$^2$ or more or 25.0 mg/m$^2$ or more, or can be 40.0 mg/m$^2$ or less or 35.0 mg/m$^2$ or less. In addition, in a case where the number of areas A included in the magnetic tape is two or more, for the two tape samples cut out from each area A, for a portion of the area A in one embodiment, and for the entire area A in another aspect, the $A_{Mag}$ obtained as an arithmetic mean of values obtained by the method described above can be in the range described above.

The magnetic tape includes one or more areas A and can also include two or more areas A. The number of areas A Ide" in 'he magnetic tape can be, for example, 5 or less, 4 or less, or 3 or less, or the number of areas A exceeding the number exemplified here can also be included in the magnetic tape. A total length of the area A (a total length of the plurality of areas A in a case where the plurality of areas A are included) can be, for example, in a range of 100 to 10,000 μm, or can also be in a range of 100 to 1,800 μm. In addition, the length of one area A can be, for example, in the range of 10 to 1,500 μm. In a case where the plurality of areas A are included in the magnetic tape, a layer configuration of the plurality of areas A, components of the various layers, a thickness, and the like can be the same in one embodiment, and can be different in another aspect.

<Area B>

In the magnetic tape in which the center line average surface roughness Ra measured on the surface of the magnetic layer is 2.5 nm to 10.0 nm, the area B satisfies the ratio $B_{Mag}/A_{Mag}$ in which the $A_{Mag}$ obtained for the area B by the method described above is 1.20 to 10.00. In the magnetic tape, the area B is a region in which the value of the center line average surface roughness Ra measured on the surface of the magnetic layer is greater (that is, a magnetic layer surface smoothness is higher) than that in the area A, and can be a region in which the extraction amount of the lubricant from the magnetic layer side is great.

The center line average surface roughness Ra (magnetic layer surface Ra) of the area B measured on the surface of the magnetic layer is 2.5 nm to 10.0 nm. The present inventors surmise that the magnetic layer surface Ra of the area B in the range described above can contribute to supply of an appropriate amount of lubricant from the area B to the magnetic head. From the above viewpoint, the magnetic layer surface Ra of the area B is preferably 2.6 nm or more, more preferably 2.8 nm or more, and still more preferably 3.0 nm or more. In addition, from the above viewpoint, the magnetic layer surface Ra of the area B is preferably 9.0 nm or less, more preferably 8.5 nm or less, even more preferably 8.0 nm or less, still preferably 7.5 nm or less, still more preferably 7.0 nm or less, still even more preferably 6.5 nm or less, and still further preferably 6.0 nm or less.

The $B_{Mag}$ obtained for the magnetic tape by the method described above is not particularly limited as long as the ratio $B_{Mag}/A_{Mag}$ is in the range described above. In one embodiment, such $B_{Mag}$ can be 20.0 mg/m$^2$ or more, 25.0 mg/m$^2$ or more, or 30.0 mg/m$^2$ or more, or can be 400.0 mg/m$^2$ or less, 350.0 mg/m$^2$ or less, or 300.0 mg/m$^2$ or less. In addition, in a case where the number of areas B included in the magnetic tape is two or more, for a portion of the area B in one embodiment, and for the entire area B in another aspect, the $B_{Mag}$ obtained as an arithmetic mean of values obtained by the method described above for the two tape samples cut out from each area B can be in the range described above.

The $B_{Back}$ obtained for the magnetic tape by the method described above is not particularly limited as long as the ratio $B_{Mag}/B_{Back}$ is in the range described above. In one embodiment, such $B_{Back}$ can be 1.0 mg/m$^2$ or more, 2.0 mg/m$^2$ or more, or 3.0 mg/m$^2$ or more, or can be 50.0 mg/m$^2$ or less, 45.0 mg/m$^2$ or less, or 40.0 mg/m$^2$ or less. In addition, in a case where the number of areas B included in the magnetic tape is two or more, for a portion of the area B in one embodiment, and for the entire area B in another aspect, the $B_{Back}$ as a value calculated as "$B_{Total}-B_{Mag}$" from $B_{Total}$ obtained as the arithmetic mean of the value obtained by the method described above for two tape samples cut out from each area B, and $B_{Mag}$ obtained as the arithmetic mean of the values obtained by the method described above for two tape samples cut out from each area B can be in the range described above.

The magnetic tape includes one or more areas B, and preferably two or more areas B, from a viewpoint of increasing a frequency of supply of the lubricant from the area B to the magnetic head. The number of areas B included in the magnetic tape can be, for example, 5 or less, 4 or less, or 3 or less, or the number of areas B exceeding the number exemplified here can also be included in the magnetic tape. A total length of the area B (a total length of the plurality of areas B in a case where the plurality of areas A are included) can be, for example, in a range of 1 to 5,000 μm, or can also be in a range of 1 to 900 μm. In addition, the length of one area B can be, for example, in the range of 1 to 200 μm. In a case where the plurality of areas B are included in the magnetic tape, a layer configuration of the plurality of areas B, components of the various layers, a thickness, and the like can be the same in one embodiment, and can be different in another aspect.

In one embodiment, in the magnetic tape, the steel ball wear volume of the area B measured on the surface of the magnetic layer can be, for example, $1\times10^{-8}$ mm$^3$ to $1\times10^{-3}$ mm$^3$, and is preferably $1\times10^{-7}$ mm$^3$ to $1\times10^{-4}$ mm$^3$. It is surmised that it is preferable that the steel ball wear volume is $1\times10^{-7}$ mm$^3$ or more, in order to supply an appropriate amount of the lubricant from the surface of the magnetic layer in the area B to the magnetic head, and it is surmised that it is preferable that the steel ball wear volume is $1\times10^{-4}$ mm$^3$ or less, in order to supply the lubricant to the magnetic head at an appropriate supply speed. From the above viewpoint, the steel ball wear volume of the area B measured on the surface of the magnetic layer is preferably $1\times10^{-7}$ mm$^3$ or more, more preferably $8\times10^{-7}$ mm$^3$ or more, and even more preferably $3\times10^{-7}$ mm$^3$ or more. In addition, from the above viewpoint, the steel ball wear volume of the area B measured on the surface of the magnetic layer is preferably $1\times10^{-4}$ mm$^3$ or more, more preferably $5\times10^{-5}$ mm$^3$ or more, and even more preferably $1\times10^{-5}$ mm$^3$ or more. The steel ball wear volume can be controlled by, for example, a type and size of the non-magnetic powder contained in the magnetic layer as an abrasive, a content in the magnetic layer, and the like.

The steel ball wear volume is a value obtained by the following method.

A tape sample having a length of 4 cm is cut out from a random position of the area B. The tape sample is fixed on a slide glass for optical microscope observation by bonding adhesive tape to two opposing sides of the four sides of the tape sample. In an environment where the atmosphere temperature is 23° C. and the relative humidity is 50%, a steel ball having a diameter of 6.25 mm is slid on the surface of the magnetic layer in a state where a load of 10 g is applied to the steel ball. As the steel ball, a steel ball in accordance with the standard of JIS B 1501: 2009 "Rolling bearing-Balls" is used. After sliding once for a distance of 25 mm at a speed of 20 mm/sec, the steel ball is moved to another non-sliding position on the surface of the magnetic layer and slid in the same manner at 20 portions on the surface of the magnetic layer. At the time of each sliding, the same position of the steel ball is brought into contact with the surface of the magnetic layer and slid. After that, the position where the steel ball was brought into contact with the surface of the magnetic layer and slid was observed with an optical microscope at a magnification ratio of 40 times, an area of a surface scraped and exposed by the sliding was obtained, and an equivalent circle diameter is calculated from this area. A volume of the ball calculated with this equivalent circle diameter as a diameter of the ball is defined as the steel ball wear volume.

In a case where the number of areas B included in the magnetic tape to be measured is one, the steel ball wear volume obtained by the method in the area B is set as the steel ball wear volume measured on the surface of the magnetic layer of the area B in the magnetic tape to be measured. In a case where the number of areas B included in the magnetic tape to be measured is two or more, the steel ball wear volume is obtained by the method in the area B, and the arithmetic mean of the steel ball wear volumes obtained for all areas B is set as the steel ball wear volume measured on the surface of the magnetic layer of the area B in the magnetic tape to be measured. In a case where the number of areas B included in the magnetic tape is two or more, for a portion of the area B in one embodiment, and for the entire area B in another aspect, the steel ball wear volume obtained by the method can be in the range.

The area A and the area B can be regions which are continuously positioned in the longitudinal direction of the magnetic tape. Here, the "regions which are continuously positioned" mean that no other region exists between these regions. For example, in a state where the magnetic tape is wound around a cartridge reel and accommodated in a magnetic tape cartridge, in a case where a side closer to the cartridge reel is referred to as an inner side and a side farther from the cartridge reel is referred to as an outer side, an aspect in which "area B/area A/area B/area A/area B" are continuous, an aspect in which "area B/area A/area B" are continuous, an aspect in which "area A/area B/area A" are continuous, an aspect in which "area A/area B" are continuous, an aspect in which "area B/area A" are continuous, and the like can be obtained from an end of the outer side towards an end of the inner side. It is preferable that at least one end of both ends of the magnetic tape is preferably an end portion of the area B, and it is more preferable that both ends are end portions of the area B, respectively.

In one embodiment, the magnetic tape including the area A and the area B can be a magnetic tape manufactured by bonding a magnetic tape that becomes the area A to a magnetic tape that becomes the area B. The bonding can be performed by a well-known means such as a splicing tape. In another aspect, the magnetic tape having the area A and the area B can be manufactured by providing the plurality of regions on one non-magnetic support by changing the composition and/or the manufacturing conditions.

Hereinafter, the magnetic layer and the like of the magnetic tape will be described more specifically. Hereinafter, unless otherwise specified, the matters described are applied to both the area A and the area B.

<Magnetic Layer>

(Ferromagnetic Powder)

As the ferromagnetic powder contained in the magnetic layer, a well-known ferromagnetic powder can be used as one kind or in combination of two or more kinds as the ferromagnetic powder used in the magnetic layer of various magnetic recording media. It is preferable to use a ferromagnetic powder having an average particle size as the ferromagnetic powder, from a viewpoint of improvement of a recording density. From this viewpoint, an average particle size of the ferromagnetic powder is preferably equal to or smaller than 50 nm, more preferably equal to or smaller than 45 nm, even more preferably equal to or smaller than 40 nm, further preferably equal to or smaller than 35 nm, further more preferably equal to or smaller than 30 nm, further even more preferably equal to or smaller than 25 nm, and still preferably equal to or smaller than 20 nm. Meanwhile, from a viewpoint of stability of magnetization, the average particle size of the ferromagnetic powder is preferably equal to or greater than 5 nm, more preferably equal to or greater than 8 nm, even more preferably equal to or greater than 10 nm, still preferably equal to or greater than 15 nm, and still more preferably equal to or greater than 20 nm.

Hexagonal Ferrite Powder

As a preferred specific example of the ferromagnetic powder, a hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which a main divalent metal atom included in this powder is a strontium atom, and the hexagonal barium ferrite powder is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one aspect of the hexagonal ferrite powder will be described more specifically.

An activation volume of the hexagonal strontium ferrite powder is preferably in a range of 800 to 1,600 $nm^3$. The atomized hexagonal strontium ferrite powder showing the activation volume in the range described above is suitable for manufacturing a magnetic tape exhibiting excellent electromagnetic conversion characteristics. The activation volume of the hexagonal strontium ferrite powder is preferably equal to or greater than 800 $nm^3$, and can also be, for example, equal to or greater than 850 $nm^3$. In addition, from a viewpoint of further improving the electromagnetic conversion characteristics, the activation volume of the hexagonal strontium ferrite powder is more preferably equal to or smaller than 1,500 $nm^3$, even more preferably equal to or smaller than 1,400 $nm^3$, still preferably equal to or smaller than 1,300 $nm^3$, still more preferably equal to or smaller than 1,200 $nm^3$, and still even more preferably equal to or smaller than 1,100 $nm^3$. The same applies to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V A unit of the anisotropy constant Ku is 1 erg/cc=1.0×10$^{-1}$ J/$m^3$.

$$Hc=2Ku/Ms\{1-[(kT/KuV)\ln(At/0.693)]^{1/2}\}$$

[In the expression, Ku: anisotropy constant (unit: J/$m^3$), Ms: saturation magnetization (unit: kA/m), k: Boltzmann's constant, T: absolute temperature (unit: K), V: activation volume (unit: $cm^3$), A: spin precession frequency (unit: $s^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10$^5$ J/$m^3$, and more preferably have Ku equal to or greater than 2.0×10$^5$ J/$m^3$. In addition, Ku of the hexagonal strontium ferrite powder can be, for example, equal to or smaller than 2.5×10$^5$ J/$m^3$. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one embodiment, the hexagonal strontium ferrite powder including the rare earth atom can have a rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content>1.0.

The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content>1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the invention and the specification means a part of the region of the particles configuring the hexagonal strontium ferrite powder towards the inside from the surface.

In a case where the hexagonal strontium ferrite powder includes the rare earth atom, a content (bulk content) of the rare earth atom is preferably in a range of 0.5 to 5.0 atom % with respect to 100 atom % of the iron atom. It is thought that the rare earth atom having the bulk content in the range described above and uneven distribution of the rare earth atom in the surface layer portion of the particles configuring the hexagonal strontium ferrite powder contribute to the prevention of a decrease in reproducing output during the repeated reproducing. It is surmised that this is because the rare earth atom having the bulk content in the range described above included in the hexagonal strontium ferrite powder and the uneven distribution of the rare earth atom in the surface layer portion of the particles configuring the hexagonal strontium ferrite powder can increase the anisotropy constant Ku. As the value of the anisotropy constant Ku is high, occurrence of a phenomenon called thermal fluctuation (that is, improvement of thermal stability) can be prevented. By preventing the occurrence of the thermal fluctuation, a decrease in reproducing output during the repeated reproducing can be prevented. It is surmised that the uneven distribution of the rare earth atom in the surface layer portion of the particles of the hexagonal strontium ferrite powder contributes to stabilization of a spin at an iron (Fe) site in a crystal lattice of the surface layer portion, thereby increasing the anisotropy constant Ku.

In addition, it is surmised that the use of the hexagonal strontium ferrite powder having the rare earth atom surface layer portion uneven distribution as the ferromagnetic powder of the magnetic layer also contributes to the prevention of chipping of the surface of the magnetic layer due to the sliding with the magnetic head. That is, it is surmised that, the hexagonal strontium ferrite powder having the rare earth atom surface layer portion uneven distribution can also contribute to the improvement of running durability of the magnetic tape. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing reduction of the reproduction output in the repeated reproduction and/or a viewpoint of further improving running durability, the content of rare earth atom (bulk content) is more preferably in a range of 0.5 to 4.5 atom %, even more preferably in a range of 1.0 to 4.5 atom %, and still preferably in a range of 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atoms are included, the bulk content is obtained from the total of the two or more kinds of rare earth atoms. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atoms are unevenly distributed in the surface layer portion (that is, a larger amount of the rare earth atoms is present, compared to that inside), in the particles configuring the hexagonal strontium ferrite powder. A ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic tape, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by, for example, a method disclosed in a paragraph 0032 of JP2015-91747A.

The partial dissolving means dissolving performed so that the hexagonal strontium ferrite powder remaining in the solution can be visually confirmed in a case of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed in a case of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 mL of hydrochloric acid having a concentration of 1 mol/L is held on a hot plate at a set temperature of 70° C. for 1 hour. The obtained solution is filtered with a membrane filter having a hole diameter of 0.1 μm. The element analysis of the filtrate obtained as described above is performed by an inductively coupled plasma (ICP) analysis device. By doing so, the surface layer portion content of the rare earth atom with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 mL of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic tape, it is desirable that the mass magnetization as of ferromagnetic powder included in the magnetic tape is high. In regards to this point, in hexagonal strontium ferrite powder which includes the rare earth atom but does not have the rare earth atom surface layer portion uneven distribution, as tends to significantly decrease, compared to that in hexagonal strontium ferrite powder not including the rare earth atom. With respect to this, it is thought that, hexagonal strontium ferrite powder having the rare earth atom surface layer portion uneven distribution is also preferable for preventing such a significant decrease in as. In one aspect, σs of the hexagonal strontium ferrite powder can be equal to or greater than 45 A×m²/kg and can also be equal to or greater than 47 A×m²/kg. On the other hand, from a viewpoint of noise reduction, as is preferably equal to or smaller than 80 A×m²/kg and more preferably equal to or smaller than 60 A×m²/kg. σs can be measured by using a well-known measurement device capable of measuring magnetic properties such as an oscillation sample type magnetic-flux meter. In the invention and the specification, the mass magnetization as is a value measured at a magnetic field strength of 15 kOe, unless otherwise noted. $1[kOe]=(10^6/4\pi)$ [A/m]

Regarding the content (bulk content) of the constituting atom in the hexagonal strontium ferrite powder, a content of the strontium atom can be, for example, in a range of 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, the hexagonal strontium ferrite powder can include a barium atom and/or a calcium atom. In a case where the other divalent metal atom other than the strontium atom is included, a content of a barium atom and a content of a calcium atom in the hexagonal strontium ferrite powder respectively can be, for example, in a range of 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can also include a rare earth atom. In addition, the hexagonal strontium ferrite powder may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproduction output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably in a range of 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Metal Powder

As a preferred specific example of the ferromagnetic powder, a ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. As a manufacturing method of the ε-iron oxide powder, a manufacturing method from a goethite, a reverse micelle method, and the like are known. All of the manufacturing methods are well known. For the method of manufacturing the ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280-S284, J. Mater. Chem. C, 2013, 1, pp. 5200-5206 can be referred, for example. However, the manufacturing method of the ε-iron oxide powder capable of being used as the ferromagnetic powder in the magnetic layer of the magnetic tape is not limited to the method described here.

An activation volume of the ε-iron oxide powder is preferably in a range of 300 to 1,500 nm$^3$. The atomized ε-iron oxide powder showing the activation volume in the range described above is suitable for manufacturing a magnetic tape exhibiting excellent electromagnetic conversion characteristics. The activation volume of the ε-iron oxide powder is preferably equal to or greater than 300 nm$^3$, and can also be, for example, equal to or greater than 500 nm$^3$. In addition, from a viewpoint of further improving the electromagnetic conversion characteristics, the activation volume of the ε-iron oxide powder is more preferably equal to or smaller than 1,400 nm$^3$, even more preferably equal to or smaller than 1,300 nm$^3$, still preferably equal to or smaller than 1,200 nm$^3$, and still more preferably equal to or smaller than 1,100 nm$^3$.

The anisotropy constant Ku can be used as an index of reduction of thermal fluctuation, that is, improvement of thermal stability. The ε-iron oxide powder can preferably have Ku equal to or greater than $3.0 \times 10^4$ J/m$^3$, and more preferably have Ku equal to or greater than $8.0 \times 10^4$ J/m$^3$. In addition, Ku of the ε-iron oxide powder can be, for example, equal to or smaller than $3.0 \times 10^5$ J/m$^3$. However, the high Ku is preferable, because it means high thermal stability, and thus, Ku is not limited to the exemplified value.

From a viewpoint of increasing reproducing output in a case of reproducing data recorded on a magnetic tape, it is desirable that the mass magnetization σs of ferromagnetic powder included in the magnetic tape is high. In regard to this point, in one aspect, σs of the ε-iron oxide powder can be equal to or greater than 8 A×m$^2$/kg and can also be equal to or greater than 12 A×m$^2$/kg. On the other hand, from a viewpoint of noise reduction, σs of the ε-iron oxide powder is preferably equal to or smaller than 40 A×m$^2$/kg and more preferably equal to or smaller than 35 A×m$^2$/kg.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed onto a photographic printing paper so that a total magnification ratio of 500,000 and an image of particles configuring the powder is obtained. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetic mean of the particle size of 500 particles obtained as described above is the average particle size of the powder. As the transmission electron microscope, a transmission electron microscope H-9000 manufactured by Hitachi, Ltd. can be used, for example. In addition, the measurement of the particle size can be performed by a well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles. A term, particles may be used for representing the powder.

As a method for collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a major axis configuring the particle, that is, a major axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the major axis configuring the particles cannot be specified from the shape, the particle size is shown as an equivalent circle diameter. The equivalent circle diameter is a value obtained by a circle projection method.

In addition, regarding an average acicular ratio of the powder, a length of a minor axis, that is, a minor axis length of the particles is measured in the measurement described above, a value of (major axis length/minor axis length) of each particle is obtained, and an arithmetic mean of the values obtained regarding 500 particles is calculated. Here, unless otherwise noted, in a case of (1), the minor axis length as the definition of the particle size is a length of a minor axis configuring the particle, in a case of (2), the minor axis length is a thickness or a height, and in a case of (3), the major axis and the minor axis are not distinguished, thus, the value of (major axis length/minor axis length) is assumed as 1, for convenience.

In addition, unless otherwise noted, in a case where the shape of the particle is specified, for example, in a case of definition of the particle size (1), the average particle size is an average major axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. A high filling percentage of the ferromagnetic powder in the magnetic layer is preferable from a viewpoint of improvement of recording density.

In one embodiment, regarding the anisotropic magnetic field Hk of the magnetic tape, the anisotropic magnetic field Hk obtained for at least the area A is preferably 10 kOe or more, more preferably 12 kOe or more, and even more preferably 14 kOe or more. In a case where the number of areas A included in the magnetic tape is two or more, the arithmetic mean of the anisotropic magnetic field Hk obtained for each area A is set as the anisotropic magnetic field Hk obtained for the area A of the magnetic tape. In addition, in a case where the number of areas A included in the magnetic tape is two or more, the Hk obtained for each of the areas A can be the same value in one embodiment, and different values in another aspect. The same also applies for the area B in a case where the number of the areas B included in the magnetic tape is two or more. However, a case where the magnetic tape for the area A is available and a case where the magnetic tape for the area B is available are as described above.

From a viewpoint of improving a recording density, it is preferable that the anisotropic magnetic field Hk is high in a region where data is recorded. Meanwhile, it is considered that, in a region where the anisotropic magnetic field Hk is high, the recording to the deep portion of the magnetic layer tends to become more difficult due to the occurrence of the spacing change, and the electromagnetic conversion characteristics more easily occurs during the repeated running in the high temperature environment. On the other hand, in the magnetic tape, the inclusion of the area B in addition to the area A can contribute to suppressing such a deterioration in the electromagnetic conversion characteristics. In addition, regarding the anisotropic magnetic field Hk of the magnetic tape, the anisotropic magnetic field Hk obtained for at least the area A is preferably 90 kOe or less, more preferably 80 kOe or less, and even more preferably 70 kOe or less.

In a case where the number of areas A included in the magnetic tape is two or more, the anisotropic magnetic field Hk can be in the range in the area A in one embodiment, and in all areas A in another aspect.

The anisotropic magnetic field Hk obtained for the area B of the magnetic tape can be 5 kOe or more in one embodiment, and can be in the range described above for the area A in another aspect. In a case where the number of areas B included in the magnetic tape is two or more, the anisotropic magnetic field Hk can be, for example, 5 kOe or more in the area B in one embodiment, and in all areas B in another aspect, or can be in the range described above, for example, for the area A.

The "anisotropic magnetic field Hk" in the invention and the specification refers to a magnetic field in which magnetization is saturated, in a case where a magnetic field is applied in a direction of the magnetization hard axis of the magnetic layer. The anisotropic magnetic field Hk can be measured by using a well-known measurement device capable of measuring magnetic properties such as a vibrating sample magnetometer. A sample piece that can be introduced into the measurement device is cut out from an area to be measured of a magnetic tape to be measured, and the Hk is measured for the sample piece at a temperature of 23° C. By setting the atmosphere temperature around the sample piece to 23° C., the temperature of the sample piece can be set to 23° C. by realizing temperature equilibrium. For example, in the magnetic layer containing a hexagonal ferrite powder and/or ε-iron oxide powder as the ferromagnetic powder, a direction of the magnetization hard axis of the magnetic layer is an in-plane direction. Regarding the unit, $1[kOe]=(10^6/4\pi)$ [A/m].

(Binding Agent)

The magnetic tape may be a coating type magnetic tape, and can include a binding agent in the magnetic layer. The binding agent is one or more kinds of resin. As the binding agent, various resins normally used as a binding agent of a coating type magnetic recording medium can be used. As the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binding agent even in the non-magnetic layer and/or a back coating layer which will be described later.

For the binding agent described above, descriptions disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions. The amount of the binding agent used can be, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

(Curing Agent)

A curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, and polyisocyanate is suitable. For the details of polyisocyanate, descriptions disclosed in paragraphs 0124 and 0125 of JP2011-216149A can be referred to. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

(Lubricant)

In the magnetic tape, the magnetic layer and/or the non-magnetic layer can contain one or more components selected from the group consisting of fatty acid, fatty acid ester, and fatty acid amide. In addition, the back coating layer can also contain one or more components selected from the group consisting of fatty acid, fatty acid ester, and fatty acid amide.

Examples of fatty acid include lauric acid, myristic acid, palmitic acid, stearic acid, oleic acid, linoleic acid, linolenic acid, behenic acid, erucic acid, and elaidic acid, stearic acid, myristic acid, and palmitic acid are preferable, and stearic acid is more preferable. Fatty acid may be included in the magnetic layer in a state of salt such as metal salt.

As fatty acid ester, esters of lauric acid, myristic acid, palmitic acid, stearic acid, oleic acid, linoleic acid, linolenic acid, behenic acid, erucic acid, and elaidic acid can be used, for example. Specific examples thereof include butyl myristate, butyl palmitate, butyl stearate, isohexadecyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

As fatty acid amide, amide of various fatty acids described above, for example, lauric acid amide, myristic acid amide, palmitic acid amide, and stearic acid amide can be used.

The lubricant extraction amounts $A_{Mag}$ and $B_{Mag}$ can be adjusted according to the amount of the lubricant contained in the composition used for forming the magnetic layer in each area and/or the composition used for forming the non-magnetic layer.

The content of fatty acid in a magnetic layer forming composition for forming the area A is, for example, 0.1 to 5.0 parts by mass, preferably 0.2 to 3.0 parts by mass, and more preferably 0.3 to 2.0 parts by mass with respect to 100.0 parts by mass of the ferromagnetic powder. A content of fatty acid ester in the magnetic layer forming composition for forming the area A is, for example, 0.5 to 6.0 parts by mass and is preferably 1.0 to 4.0 parts by mass with respect to 100.0 parts by mass of ferromagnetic powder. The content of fatty acid amide in a magnetic layer forming composition for forming the area A is, for example, 0.1 to 1.0 parts by mass, preferably 0.2 to 0.7 parts by mass, and more preferably 0.3 to 0.5 parts by mass with respect to 100.0 parts by mass of the ferromagnetic powder.

The content of fatty acid in a magnetic layer forming composition for forming the area B is, for example, 0.3 to 10.0 parts by mass, preferably 0.5 to 6.0 parts by mass, and more preferably 0.7 to 3.0 parts by mass with respect to 100.0 parts by mass of the ferromagnetic powder. A content of fatty acid ester in the magnetic layer forming composition for forming the area B is, for example, 0.5 to 15.0 parts by mass and is preferably 1.0 to 5.0 parts by mass with respect to 100.0 parts by mass of ferromagnetic powder. The content of fatty acid amide in a magnetic layer forming composition for forming the area B is, for example, 0.1 to 1.0 parts by mass, preferably 0.2 to 0.7 parts by mass, and more preferably 0.3 to 0.5 parts by mass with respect to 100.0 parts by mass of the ferromagnetic powder.

In addition, in a case where the magnetic tape includes a non-magnetic layer between the non-magnetic support and the magnetic layer in the area A, the content of fatty acid in a non-magnetic layer forming composition for forming the area A is, for example, 0.1 to 5.0 parts by mass, preferably 0.3 to 3.0 parts by mass, and more preferably 0.5 to 2.0 parts by mass with respect to 100.0 parts by mass of non-magnetic powder. A content of fatty acid ester in the non-magnetic layer forming composition for forming the area A is, for example, 0.5 to 6.0 parts by mass and is preferably 1.5 to 4.0 parts by mass with respect to 100.0 parts by mass of non-magnetic powder. A content of fatty acid amide in the non-magnetic layer forming composition for forming the area A is, for example, 0.1 to 1.0 parts by mass and is preferably 0.2 to 0.6 parts by mass with respect to 100.0 parts by mass of non-magnetic powder.

In a case where the magnetic tape includes a non-magnetic layer between the non-magnetic support and the magnetic layer in the area B, the content of fatty acid in a non-magnetic layer forming composition for forming the area B is, for example, 0.5 to 10.0 parts by mass, preferably 0.7 to 6.0 parts by mass, and more preferably 1.0 to 3.0 parts by mass with respect to 100.0 parts by mass of non-magnetic powder. A content of fatty acid ester in the non-magnetic layer forming composition for forming the area B is, for example, 0.5 to 15.0 parts by mass and is preferably 1.0 to 5.0 parts by mass with respect to 100.0 parts by mass of non-magnetic powder. A content of fatty acid amide in the non-magnetic layer forming composition for forming the area B is, for example, 0.1 to 1.0 parts by mass and is preferably 0.2 to 0.6 parts by mass with respect to 100.0 parts by mass of non-magnetic powder.

In the invention and the specification, a given component may be used alone or used in combination of two or more kinds thereof, unless otherwise noted. In a case where two or more kinds of given components are used, the content is a total content of the two or more kinds of components.

(Additives)

The magnetic layer may include one or more kinds of additives, as necessary. As specific examples of the additives, the curing agent described above is used as an example. In addition, examples of the additive included in the magnetic layer include a non-magnetic powder (for example, inorganic powder, carbon black, or the like), a dispersing agent, a dispersing assistant, a fungicide, an antistatic agent, and an antioxidant. For the dispersing agent, a description disclosed in paragraphs 0061 and 0071 of JP2012-133837A can be referred to. The dispersing agent may be added to a non-magnetic layer forming composition. For the dispersing agent which can be added to the non-magnetic layer forming composition, a description disclosed in paragraph 0061 of JP2012-133837A can be referred to. As the non-magnetic powder which may be contained in the magnetic layer, non-magnetic powder which can function as an abrasive, non-magnetic powder (for example, non-magnetic colloid particles) which can function as a projection formation agent which forms projections suitably protruded from the surface of the magnetic layer, and the like can be used. An average particle size of colloidal silica (silica colloid particles) shown in the examples which will be described later is a value obtained by a method disclosed in a measurement method of an average particle diameter in a paragraph 0015 of JP2011-048878A. As the additives, a commercially available product can be suitably selected according to the desired properties or manufactured by a well-known method, and can be used with any amount. As an example of the additive which can be used for improving dispersibility of the abrasive in the magnetic layer including the abrasive, a dispersing agent disclosed in paragraphs 0012 to 0022 of JP2013-131285A can be used.

The abrasive is preferably a non-magnetic powder having Mohs hardness exceeding 8 and more preferably a non-magnetic powder having Mohs hardness equal to or greater than 9. A maximum value of Mohs hardness is 10. The abrasive can be a powder of an inorganic substance and can also be a powder of an organic substance. The abrasive can be a powder of an inorganic or organic oxide or a powder of a carbide. Examples of the carbide include a boron carbide (for example, $B_4C$), a titanium carbide (for example, TiC), and the like. In addition, diamond can also be used as the abrasive. In one embodiment, the abrasive is preferably a powder of an inorganic oxide. Specifically, examples of the inorganic oxide include alumina (for example, $Al_2O_3$), a titanium oxide (for example, $TiO_2$), a cerium oxide (for example, $CeO_2$), a zirconium oxide (for example, $ZrO_2$), and the like, and alumina is preferable among these. The Mohs hardness of alumina is approximately 9. For details of the alumina powder, description disclosed in paragraph 0021 of JP2013-229090A can also be referred to. In addition, an average particle size of the abrasive is preferably in a range of 0.02 to 0.50 μm, more preferably in a range of 0.05 to 0.40 μm, and even more preferably in a range of 0.12 to 0.32 μm. In addition, a specific surface area can be used as an index of a particle size of the abrasive. As the abrasive, it is preferable to use an abrasive having a specific surface area measured by a Brunauer-Emmett-Teller (BET) method (hereinafter referred to as a "BET specific surface area") equal to or greater than 14 $m^2$/g. In addition, from a viewpoint of dispersibility, it is preferable to use an abrasive having a BET specific surface area equal to or less than 40 $m^2$/g. A content of the abrasive in the magnetic layer is preferably 1.0 to 20.0 parts by mass and more preferably 1.0 to 18.0 parts by mass with respect to 100.0 parts by mass of the ferromagnetic powder.

The magnetic layer described above can be provided on the surface of the non-magnetic support directly or indirectly through the non-magnetic layer.

<Non-Magnetic Layer>

Next, the non-magnetic layer will be described. The magnetic tape may include a magnetic layer directly on the surface of the non-magnetic support in the area A and/or the area B or may include a magnetic layer on the surface of the non-magnetic support through the non-magnetic layer including the non-magnetic powder. The non-magnetic powder used in the non-magnetic layer may be a powder of an inorganic substance or a powder of an organic substance. In addition, carbon black and the like can be used. Examples of powder of the inorganic substance include powder of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50% to 90% by mass and more preferably 60% to 90% by mass.

The non-magnetic layer can include a binding agent and can also include additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

<Non-Magnetic Support>

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance. As described above, the magnetic layer surface Ra of the area A and the magnetic layer surface Ra of the area B can be controlled by the surface shape (for example, the center line average surface roughness Ra) of the surface of the non-magnetic support on a side where the magnetic layer is provided. Regarding this point, for example, in the area A, the center line average surface roughness Ra of the surface of the non-magnetic support on the side where the magnetic layer is provided can be in the range described above for the magnetic layer surface Ra of the area A. In the area B, the center line average surface roughness Ra of the surface of the non-magnetic support on the side where the magnetic layer is provided is preferably 2.6 nm or more, more preferably 2.8 nm or more, and even more preferably 3.0 nm or more. In addition, in the area B, the center line average surface roughness Ra of the surface of the non-magnetic support on the side where the magnetic layer is provided is preferably 15.0 nm or less, more preferably 13.0 nm or less, and even more preferably 10.0 nm or less.

<Back Coating Layer>

The magnetic tape includes a back coating layer including non-magnetic powder on a side of the non-magnetic support opposite to the surface side including the magnetic layer.

That is, the area A and the area B include the back coating layer. The back coating layer preferably includes any one or both of carbon black and inorganic powder. The back coating layer can include a binding agent and can also include additives. In regards to the binding agent included in the back coating layer and various additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

In the magnetic tape, the back coating layer of the area B can contain one or more components selected from the group consisting of fatty acid, fatty acid ester, and fatty acid amide. As a means for controlling the ratio $B_{Mag}/B_{Back}$ to 2.0 or more, two back coating layers can be provided to increase a proportion of the binding agent in an upper back coating layer. Here, the "upper back coating layer" refers to a back coating layer positioned on the surface layer side in the two back coating layers. On the other hand, among the two back coating layers, the back coating layer positioned on the non-magnetic support side is referred to as a "lower back coating layer". Since voids of the back coating layer can be reduced by increasing the proportion of the binding agent in the upper back coating layer, it is considered that the movement of the lubricant to the back coating layer from the magnetic layer side can be suppressed or the movement amount can be reduced, in a state where the surface of the magnetic layer is in contact with the surface of the back coating layer.

In addition, the lubricant extraction amount $B_{Back}$ of the back coating layer of the area B can be adjusted, for example, by the amount of the lubricant contained in the composition used for forming the back coating layer of the area B.

The content of fatty acid in a back coating layer forming composition for forming the area B is, for example, 0.0 to 10.0 parts by mass, preferably 0.0 to 5.0 parts by mass, and more preferably 0.0 to 2.0 parts by mass with respect to 100.0 parts by mass of the non-magnetic powder. A content of fatty acid ester in the back coating layer forming composition for forming the area B is, for example, 0.0 to 10.0 parts by mass and is preferably 0.0 to 3.0 parts by mass with respect to 100.0 parts by mass of non-magnetic powder. The content of fatty acid amide in a back coating layer forming composition for forming the area B is, for example, 0.0 to 1.0 parts by mass, preferably 0.0 to 0.7 parts by mass, and more preferably 0.0 to 0.4 parts by mass with respect to 100.0 parts by mass of the non-magnetic powder.

In addition, in the magnetic tape, the back coating layer of the area A can contain one or more components selected from the group consisting of fatty acid, fatty acid ester, and fatty acid amide.

The content of fatty acid in a back coating layer forming composition for forming the area A is, for example, 0.0 to 10.0 parts by mass, preferably 0.0 to 5.0 parts by mass, and more preferably 0.0 to 2.0 parts by mass with respect to 100.0 parts by mass of the non-magnetic powder. A content of fatty acid ester in the back coating layer forming composition for forming the area A is, for example, 0.0 to 10.0 parts by mass and is preferably 0.0 to 3.0 parts by mass with respect to 100.0 parts by mass of non-magnetic powder. The content of fatty acid amide in a back coating layer forming composition for forming the area A is, for example, 0.0 to 1.0 parts by mass, preferably 0.0 to 0.7 parts by mass, and more preferably 0.0 to 0.4 parts by mass with respect to 100.0 parts by mass of the non-magnetic powder.

<Various Thicknesses>

Regarding a thickness (total thickness) of the magnetic tape, it has been required to increase recording capacity (increase in capacity) of the magnetic tape along with the enormous increase in amount of information in recent years. As a unit for increasing the capacity, a thickness of the magnetic tape is reduced (hereinafter, also referred to as "thinning") and a length of the magnetic tape accommodated in one reel of the magnetic tape cartridge is increased. From this point, the thickness (total thickness) of at least area A of the magnetic tape is preferably 5.6 μm or less, more preferably 5.5 μm or less, even more preferably 5.4 μm or less, still preferably 5.3 μm or less, and still more preferably 5.2 μm or less. In addition, from a viewpoint of ease of handling, the thickness of the magnetic tape is preferably 3.0 μm or more and more preferably 3.5 μm or more.

In one embodiment, for the area B, the thickness (total thickness) can be in the range described above. In another aspect, the thickness of the area B can be a thickness exceeding the range described above (for example, 5.7 μm to 7.0 μm). The thicknesses of the area A and the area B can be the same in one embodiment and can be different in another aspect.

In a case where the number of areas A included in the magnetic tape is two or more, the thickness (total thicknesses) of the areas A can be the same value in one embodiment, and different values in another aspect. In a case where the number of areas A included in the magnetic tape is two or more, the thickness of the magnetic layer in these areas A can be the same value in one embodiment, and different values in another aspect. The same also applies to other layers. In addition, the above point is also same for the thickness (total thicknesses) of the area B and the thickness of various layers in a case where the number of areas B included in the magnetic tape is two or more.

In the area A, a thickness of the non-magnetic support is preferably 3.0 to 5.0 μm.

A thickness of the magnetic layer can be optimized according to a saturation magnetization amount of a magnetic head used, a head gap length, a recording signal band, and the like. In the area A, the thickness of the magnetic layer is, for example, 0.01 μm to 0.15 μm, preferably 0.02 μm to 0.12 μm, and more preferably 0.03 μm to 0.1 μm, from a viewpoint of realization of high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

In the area A, a thickness of the non-magnetic layer is, for example, 0.1 to 2.0 μm, preferably 0.1 to 1.5 μm, and more preferably 0.1 to 1.0 μm.

In the area A, a thickness of the back coating layer is preferably 0.9 μm or less and more preferably 0.1 to 0.7 μm.

Various thicknesses in the area B can also be set in the range described above. In a case where the area B includes two or more back coating layers, the thickness of the back coating layer is a total thickness of these layers. In one embodiment, the thickness of the non-magnetic layer in the area B is preferably thicker than the thickness of the non-magnetic layer in the area A. This is because it is considered that a larger amount of the lubricant can be contained in the non-magnetic layer by increasing the thickness of the non-magnetic layer, and as a result, the amount of lubricant supplied from the area B can be increased.

Various thicknesses such as the thickness of the magnetic layer and the like can be obtained by the following method.

A cross section of the magnetic tape in the thickness direction is exposed with an ion beam and the cross section observation of the exposed cross section is performed using a scanning electron microscope. Various thicknesses can be obtained as the arithmetic mean of the thicknesses obtained at two random portions in the cross section observation. Alternatively, various thicknesses can be obtained as a designed thickness calculated under the manufacturing conditions.

<Manufacturing Step>
(Preparation of Each Layer Forming Composition)

A step of preparing a composition for forming the magnetic layer, the non-magnetic layer or the back coating layer can generally include at least a kneading step, a dispersing step, and a mixing step provided before and after these steps, in a case where necessary. Each step may be divided into two or more stages. The component used in the preparation of each layer forming composition may be added at an initial stage or in a middle stage of each step. As the solvent, one kind or two or more kinds of various kinds of solvents usually used for producing a coating type magnetic recording medium can be used. For the solvent, a description disclosed in a paragraph 0153 of JP2011-216149A can be referred to, for example. In addition, each component may be separately added in two or more steps. For example, a binding agent may be separately added in a kneading step, a dispersing step, and a mixing step for adjusting viscosity after the dispersion. In order to manufacture the magnetic tape, a well-known manufacturing technology can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-79274A (JP-H01-79274A) can be referred to. As a disperser, a well-known dispersion device can be used. The filtering may be performed by a well-known method in any stage for preparing each layer forming composition. The filtering can be performed by using a filter, for example. As the filter used in the filtering, a filter having a hole diameter of 0.01 to 3 μm (for example, filter made of glass fiber or filter made of polypropylene) can be used, for example.

(Coating Step)

The magnetic layer can be formed by directly applying the magnetic layer forming composition onto the surface of the non-magnetic support or performing multilayer coating of the magnetic layer forming composition with the non-magnetic layer forming composition in order or at the same time. The back coating layer can be formed by applying the back coating layer forming composition onto the surface of the non-magnetic support opposite to the surface provided with the non-magnetic layer and/or the magnetic layer (or non-magnetic layer and/or the magnetic layer is to be provided). For details of the coating for forming each layer, a description disclosed in a paragraph 0066 of JP2010-231843A can be referred to.

(Other Steps)

For various other steps for manufacturing the magnetic tape, a well-known technology can be applied. For details of the various steps, descriptions disclosed in paragraphs 0067 to 0070 of JP2010-231843A can be referred to, for example. For example, the coating layer of the magnetic layer forming composition can be subjected to an alignment process in an alignment zone, while the coating layer is wet. For the alignment process, various technologies disclosed in a paragraph 0052 of JP2010-24113A can be applied. For example, a homeotropic alignment process can be performed by a well-known method such as a method using a different polar facing magnet. In the alignment zone, a drying speed of the coating layer can be controlled by a temperature and an air flow of the dry air and/or a transporting rate in the alignment zone. In addition, the coating layer may be preliminarily dried before transporting to the alignment zone.

Through various steps, a long magnetic tape raw material can be obtained. The obtained magnetic tape raw material is normally cut (slit) by a well-known cutter to have a width of a magnetic tape to be wound around the magnetic tape cartridge. The width is determined according to the standard and is normally ½ inches.

In the magnetic tape obtained by slitting, a servo pattern can be formed on at least a part of the magnetic layer. The servo pattern will be described later in detail.

(Heat Treatment)

In one embodiment, the magnetic tape can be a magnetic tape manufactured through the following heat treatment. In addition, in another aspect, the magnetic tape can be a magnetic tape manufactured without performing the following heat treatment. In addition, in one embodiment, at least a part of one of the area A and the area B can be manufactured through the heat treatment and other portions can be manufactured without performing the heat treatment as below.

As the heat treatment, the magnetic tape slit and cut to have a width determined according to the standard described above can be wound around a core member and can be subjected to the heat treatment in the wound state.

In one embodiment, the heat treatment is performed in a state where the magnetic tape is wound around the core member for heat treatment (hereinafter, referred to as a "core for heat treatment"), and the magnetic tape after the heat treatment can be wound around another reel such as a reel of a magnetic tape cartridge.

The core for heat treatment can be formed of metal, a resin, or paper. The material of the core for heat treatment is preferably a material having high stiffness, from a viewpoint of preventing the occurrence of a winding defect such as spoking or the like. From this viewpoint, the core for heat treatment is preferably formed of metal or a resin. In addition, as an index for stiffness, a bending elastic modulus of the material for the core for heat treatment is preferably equal to or greater than 0.2 GPa (gigapascal) and more preferably equal to or greater than 0.3 GPa. Meanwhile, since the material having high stiffness is normally expensive, the use of the core for heat treatment of the material having stiffness exceeding the stiffness capable of preventing the occurrence of the winding defect causes the cost increase. By considering the viewpoint described above, the bending elastic modulus of the material for the core for heat treatment is preferably equal to or smaller than 250 GPa. The bending elastic modulus is a value measured based on international organization for standardization (ISO) 178 and the bending elastic modulus of various materials is well known. In addition, the core for heat treatment can be a solid or hollow core member. In a case of a hollow shape, a wall thickness is preferably equal to or greater than 2 mm, from a viewpoint of maintaining the stiffness. In addition, the core for heat treatment may include or may not include a flange.

The magnetic tape having a length equal to or greater than a length to be finally accommodated in the magnetic tape cartridge (hereinafter, referred to as a "final length") is prepared as the magnetic tape wound around the core for heat treatment, and it is preferable to perform the heat treatment by placing the magnetic tape in the heat treatment environment, in a state where the magnetic tape is wound around the core for heat treatment. The magnetic tape length wound around the core for heat treatment is equal to or greater than the final length, and is preferably the "final length+α", from a viewpoint of ease of winding around the core for heat treatment. This α is preferably equal to or greater than 5 μm, from a viewpoint of ease of the winding. The tension in a case of winding around the core for heat treatment is preferably equal to or greater than 0.1 N (newton). In addition, from a viewpoint of preventing the occurrence of excessive deformation, the tension in a case of winding around the core for heat treatment is preferably equal to or smaller than 1.5 N and more preferably equal to or smaller than 1.0 N. An outer diameter of the core for heat treatment is preferably equal to or greater than 20 mm and more preferably equal to or greater than 40 mm, from viewpoints of ease of the winding and preventing coiling (curl in longitudinal direction). The outer diameter of the core for heat treatment is preferably equal to or smaller than 100 mm and more preferably equal to or smaller than 90 mm. A width of the core for heat treatment may be equal to or greater than the width of the magnetic tape wound around this core. In addition, after the heat treatment, in a case of detaching the magnetic tape from the core for heat treatment, it is preferable that the magnetic tape and the core for heat treatment are sufficiently cooled and magnetic tape is detached from the core for heat treatment, in order to prevent the occurrence of the tape deformation which is not intended during the detaching operation. It is preferable the detached magnetic tape is wound around another core temporarily (referred to as a "core for temporary winding"), and the magnetic tape is wound around another reel (for example, outer diameter is approximately 40 to 50 mm) from the core for temporary winding. Accordingly, a relationship between the inside and the outside with respect to the core for heat treatment of the magnetic tape in a case of the heat treatment can be maintained and the magnetic tape can be wound around the reel of the magnetic tape cartridge. Regarding the details of the core for temporary winding and the tension in a case of winding the magnetic tape around the core, the description described above regarding the core for heat treatment can be referred to. In an aspect in which the heat treatment is subjected to the magnetic tape having a length of the "final length+α", the length corresponding to "+α" may be cut in any stage. For example, in one aspect, the magnetic tape having the final product length may be wound around another reel from the core for temporary winding and the remaining length corresponding the "+α" may be cut. From a viewpoint of decreasing the amount of the portion to be cut out and removed, the a is preferably equal to or smaller than 20 m.

The specific aspect of the heat treatment performed in a state of being wound around the core member as described above is described below.

An atmosphere temperature for performing the heat treatment (hereinafter, referred to as a "heat treatment temperature") is preferably equal to or higher than 40° C. and more preferably equal to or higher than 50° C. On the other hand, from a viewpoint of preventing the excessive deformation, the heat treatment temperature is preferably equal to or lower than 75° C., more preferably equal to or lower than 70° C., and even more preferably equal to or lower than 65° C.

A weight absolute humidity of the atmosphere for performing the heat treatment is preferably equal to or greater than 0.1 g/kg Dry air and more preferably equal to or greater than 1 g/kg Dry air. The atmosphere in which the weight absolute humidity is in the range described above is preferable, because it can be prepared without using a special device for decreasing moisture. On the other hand, the weight absolute humidity is preferably equal to or smaller than 70 g/kg Dry air and more preferably equal to or smaller than 66 g/kg Dry air, from a viewpoint of preventing a deterioration in workability by dew condensation. The heat treatment time is preferably equal to or longer than 0.3 hours and more preferably equal to or longer than 0.5 hours. In addition, the heat treatment time is preferably equal to or shorter than 48 hours, from a viewpoint of production efficiency.

(Formation of Servo Pattern)

The "formation of the servo pattern" can be "recording of a servo signal". The formation of the servo pattern will be described below.

The servo pattern is generally formed along a longitudinal direction of the magnetic tape. As a system of control using a servo signal (servo control), timing-based servo (TBS), amplitude servo, or frequency servo is used.

As shown in European Computer Manufacturers Association (ECMA)-319 (June 2001), a timing-based servo system is used in a magnetic tape based on a linear tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. In the invention and the specification, the "timing-based servo pattern" refers to a servo pattern that enables head tracking in a servo system of a timing-based servo system. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of servo patterns continuous in the longitudinal direction of the magnetic tape. A plurality of servo bands are normally provided on the magnetic tape. For example, the number thereof is 5 in the LTO tape. A region interposed between two adjacent servo bands is a data band. The data band is configured of a plurality of data tracks and each data track corresponds to each servo track.

In one aspect, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pairs of servo stripes in the servo band so that the position thereof is relatively deviated in the longitudinal direction of the magnetic tape. Specifically, the position of the shifted specific servo stripe among the plurality of pairs of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 (June 2001) is used. In this staggered method, a plurality of the groups of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319 (June 2001), information showing the position in the longitudinal direction of the magnetic tape (also referred to as "Longitudinal Position (LPOS) information") is normally embedded in each servo band. This LPOS information is recorded so that the position of one pair of servo stripes is shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head generally includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo pattern to be formed. The width of each gap can be set as, for example, equal to or smaller than 1 μm, 1 to 10 μm, or equal to or greater than 10 μm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowly decreasing an intensity of the magnetic field, while reversing a direction of the magnetic field applied to the magnetic tape. Meanwhile, the DC erasing is performed by applying the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing is opposite to each other. Accordingly, the output of the servo signal obtained by the reading of the servo pattern can be increased. As disclosed in JP2012-53940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

The magnetic tape preferably has a servo pattern in at least the magnetic layer in the area A, and more preferably has a servo pattern in the magnetic layer in the area B as well. The area A can preferably be a data recording region where data is recorded by the magnetic head. In one embodiment, the data can also be recorded in the area B by a magnetic head. More preferably, in a case where the magnetic tape is caused to run for recording the data on the magnetic tape and/or reproducing the recorded data, the running condition of the area B can be controlled according to the measurement result regarding the recording and reproducing quality of the data in the area A. The running condition of the area B can be controlled by using the servo signal read by the servo pattern reading element. The recording and reproducing quality described above is used in a sense that includes recording quality and reproducing quality. As an example, a signal-to-noise ratio (SNR) which is an indicator of the electromagnetic conversion characteristics can be used as the measurement result regarding the recording and reproducing quality. Examples of the running condition of the area B include the number of times the surface of the magnetic layer of the area B and the magnetic head slide, a distance that the magnetic head slides with the surface of the magnetic layer of the area B, and the like. For example, in a case where a decrease in SNR occurs in the area A during the repeated running, a larger amount of lubricant is supplied to the magnetic head by increasing the number of times that the magnetic head slides with the surface of the magnetic layer of the area B and/or increasing the distance that the magnetic head slides with the surface of the magnetic layer of the area B, thereby improving the electromagnetic conversion characteristics.

In addition, in one embodiment, the dimensional information of the magnetic tape in the width direction during the running can be obtained using a servo signal, and the dimension of the magnetic tape in the width direction can be controlled by adjusting and changing the tension applied in the longitudinal direction of the magnetic tape according to the obtained dimensional information. During the recording or the reproducing, the tension adjustment can contribute to suppression of recording or reproducing of data by deviating the magnetic head for recording or reproducing of data from a target track position due to width deformation of the magnetic tape.

[Magnetic Tape Cartridge]

According to another aspect of the invention, there is provided a magnetic tape cartridge comprising the magnetic tape described above.

The details of the magnetic tape included in the tape cartridge are as described above.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device in order to record and/or reproduce data on the magnetic tape, the magnetic tape is drawn from the magnetic tape cartridge and wound around the reel on the magnetic tape device side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic tape device side. In the meantime, for example, the magnetic head comes into contact with and slides on the surface of the magnetic layer of the magnetic tape, and accordingly, the recording and/or reproducing of data is performed. With respect to this, in the twin reel type magnetic tape cartridge, both reels of the supply reel and the winding reel are provided in the magnetic tape cartridge.

[Magnetic Tape Device]

According to still another aspect of the invention, there is provided a magnetic tape device comprising the magnetic tape and a magnetic head. In the magnetic tape device, the recording of data on the magnetic tape and/or the reproducing of data recorded on the magnetic tape can be performed by bringing the surface of the magnetic layer of the magnetic tape into contact with the magnetic head and sliding.

In the invention and the specification, the "magnetic tape device" means a device capable of performing at least one of the recording of data on the magnetic tape or the reproducing of data recorded on the magnetic tape. Such a device is generally called a drive. The magnetic head included in the magnetic tape device can be a recording head capable of performing the recording of data on the magnetic tape, and can also be a reproducing head capable of performing the reproducing of data recorded on the magnetic tape. In addition, in the embodiment, the magnetic tape device can include both of a recording head and a reproducing head as separate magnetic heads. In another embodiment, the magnetic head included in the magnetic tape device may have a configuration in which both the recording element and the reproducing element are comprised in one magnetic head. As the reproducing head, a magnetic head (MR head) including a magnetoresistive (MR) element capable of reading information recorded on the magnetic tape with excellent sensitivity as the reproducing element is preferable. As the MR head, various well-known MR heads (for example, a Giant Magnetoresistive (GMR) head, or a Tunnel Magnetoresistive (TMR) head) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) including a servo signal reading element may be included in the magnetic tape device. For example, the magnetic head which performs the recording of data and/or reproducing of the recorded data (hereinafter, also referred to as a "recording and reproducing head") can include two servo signal reading elements, and each of the two servo signal reading elements can read two adjacent servo bands with the data band interposed therebetween at the same time. One or a plurality of elements for data can be disposed between the two servo signal reading elements. The element for recording data (recording element) and the element for reproducing data (reproducing element) are collectively referred to as "elements for data".

As described above, a region where the magnetic head records data is preferably included in at least the area A, and can also be included in the area B.

In a case of recording data and/or reproducing recorded data, first, tracking using a servo signal can be performed. That is, as the servo signal reading element follows a predetermined servo track, the element for data can be controlled to pass on the target data track. The movement of the data track is performed by changing the servo track to be read by the servo signal reading element in the tape width direction.

In addition, the recording and reproducing head can perform the recording and/or reproducing with respect to other data bands. In this case, the servo signal reading element is moved to a predetermined servo band by using the UDIM information described above, and the tracking with respect to the servo band may be started.

Figure 2:
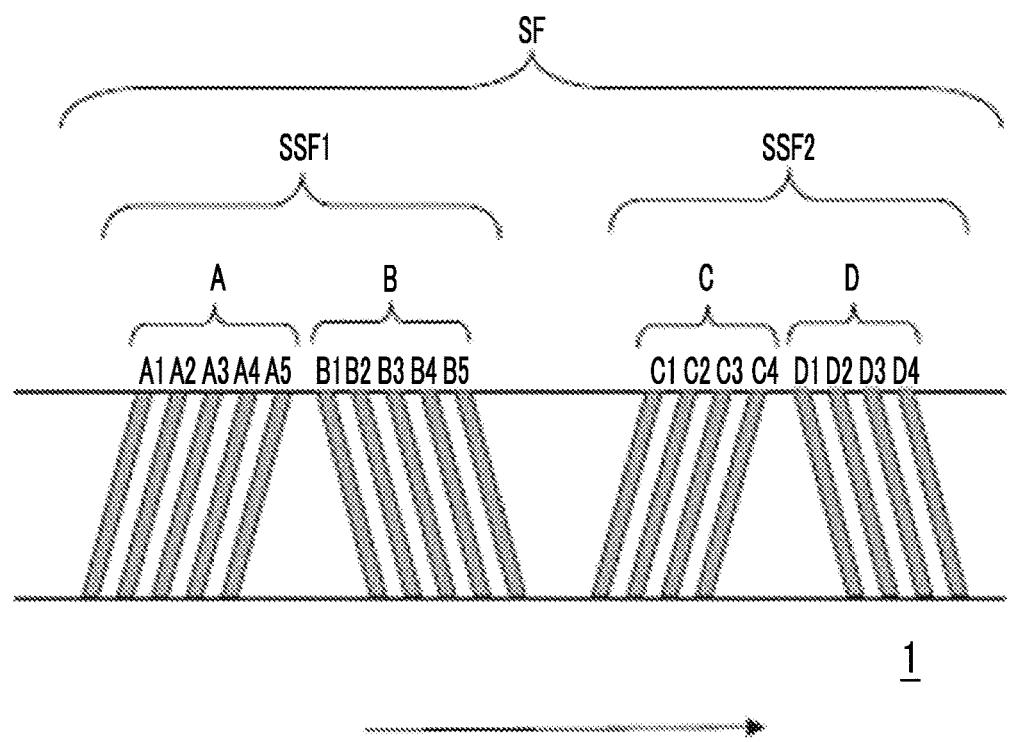
FIG. 2 shows a servo pattern disposition example of a linear tape-open (LTO) Ultrium format tape.

FIG. 1 shows an example of disposition of data bands and servo bands. In FIG. 1, a plurality of servo bands 1 are disposed to be interposed between guide bands 3 in a magnetic layer of a magnetic tape MT. A plurality of regions 2 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 2 are formed on a servo band, in a case of manufacturing a magnetic tape. Specifically, in FIG. 2, a servo frame SF on the servo band 1 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame for explaining. However, in practice, in the magnetic layer of the magnetic tape in which the head tracking servo in the timing-based servo system is performed, a plurality of servo frames are disposed in each servo band in a running direction. In FIG. 2, an arrow shows the running direction. For example, an LTO Ultrium format tape generally includes 5,000 or more servo frames per a tape length of 1 m, in each servo band of the magnetic layer.

In the magnetic tape device, in one embodiment, the magnetic tape is treated as a removable medium (a so-called interchangeable medium), and a magnetic tape cartridge wound around a reel and accommodating the magnetic tape is inserted into and extracted from the magnetic tape device. In another aspect, the magnetic tape is not treated as an interchangeable medium, the magnetic tape is wound around a reel of a magnetic tape device including a magnetic head, and the magnetic tape is accommodated in the magnetic tape device. In any aspect, an outer diameter of the reel around which the magnetic tape is wound can be, for example, approximately 80.0 to 100.0 mm, and an inner diameter of the reel can be, for example, approximately 22.0 to 50.0 mm.

EXAMPLES

Hereinafter, one embodiment of the invention will be described with reference to examples. However, the invention is not limited to aspects shown in the examples. "Parts" and "%" in the following description mean "parts by mass" and "% by mass", unless otherwise noted. "eq" indicates equivalent and a unit not convertible into SI unit.

In addition, various steps and operations described below were performed in an environment of a temperature of 20° C. to 25° C. and a relative humidity of 40% to 60%, unless otherwise noted.

Example 1

<Manufacturing of Magnetic Tape for Area A>
(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin including a $SO_3Na$ group as a polar group (UR-4800 manufactured by Toyobo Co., Ltd. (polar group amount: 80 meq/kg)), and 570.0 parts of a mixed solution of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of 65% and a BET specific surface area of 20 m²/g, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List

Magnetic Liquid
Ferromagnetic powder (see Table 1): 100.0 parts
$SO_3Na$ group-containing polyurethane resin: 14.0 parts
Weight-average molecular weight: 70,000, $SO_3Na$ group: 0.2 meq/g
Cyclohexanone: 150.0 parts
Methyl ethyl ketone: 150.0 parts
Abrasive solution
Alumina dispersion prepared in the section (1): 6.0 parts
Silica Sol (Projection Formation Agent Liquid)
Colloidal silica (average particle size: 120 nm): 2.0 parts
Methyl ethyl ketone: 1.4 parts
Other Components
Stearic acid: 2.0 parts
Stearic acid amide: 0.2 parts
Butyl stearate: 2.0 parts
Polyisocyanate (CORONATE (registered product) L manufactured by Tosoh Corporation): 2.5 parts
Finishing Additive Solvent
Cyclohexanone: 200.0 parts
Methyl ethyl ketone: 200.0 parts (3) Non-Magnetic Layer Forming Composition List Non-magnetic inorganic powder (α-iron oxide): 100.0 parts
Average particle size (average major axis length): 0.15 μm
Average acicular ratio: 7
BET specific surface area: 52 m²/g
Carbon black: 20.0 parts
Average particle size: 20 nm
$SO_3Na$ group-containing polyurethane resin: 18.0 parts
Weight-average molecular weight: 70,000, $SO_3Na$ group: 0.2 meq/g
Stearic acid: see Table 1
Stearic acid amide: see Table 1
Butyl stearate: see Table 1
Cyclohexanone: 300.0 parts
Methyl ethyl ketone: 300.0 parts (4) Back Coating Layer Forming Composition List Carbon black: 100.0 parts
DBP (Dibutyl phthalate) oil absorption: 74 cm³/100 g
Nitrocellulose: 27.0 parts
Polyester polyurethane resin including sulfonic acid group and/or salt thereof: 62.0 parts
Polyester resin: 4.0 parts
Alumina powder (BET specific surface area: 17 m²/g): 0.6 parts
Methyl ethyl ketone: 600.0 parts
Toluene: 600.0 parts
Polyisocyanate (CORONATE (registered product) L manufactured by Tosoh Corporation): 15.0 parts (5) Preparation of Each Layer Forming Composition The magnetic layer forming composition was prepared by the following method. The magnetic liquid was prepared by dispersing (beads-dispersing) each component by using a batch type vertical sand mill for 24 hours. As dispersion beads, zirconia beads having a bead diameter of 0.5 mm were used. The prepared magnetic liquid were mixed with the abrasive solution, and other components (silica sol, other components, and finishing additive solvent) and beads-dispersed for 5 minutes by using the sand mill, and the treatment (ultrasonic dispersion) was performed with a batch type ultrasonic device (20 kHz, 300 W) for 0.5 minutes. After that, the obtained mixed solution was filtered by using a filter having a hole diameter of 0.5 μm, and the magnetic layer forming composition was prepared.

The non-magnetic layer forming composition was prepared by the following method. The components described above excluding the lubricant (stearic acid, stearic acid amide, and butyl stearate) were kneaded and diluted by an open kneader, and subjected to a dispersion process with a transverse beads mill disperser. After that, the lubricant (stearic acid, stearic acid amide, and butyl stearate) was added, and stirred and mixed with a dissolver stirrer, and a non-magnetic layer forming composition was prepared.

The back coating layer forming composition was prepared by the following method. The components excluding polyisocyanate were introduced in a dissolver stirrer and stirred at a circumferential speed of 10 m/sec for 30 minutes, and the dispersion process was performed with a transverse beads mill disperser. After that, polyisocyanate was added, and stirred and mixed with a dissolver stirrer, and a back coating layer forming composition was prepared.

(6) Manufacturing of Magnetic Tape

A non-magnetic layer was formed on a surface of a biaxially stretched polyethylene terephthalate, in which a center line average surface roughness Ra (in Table 1, "support surface Ra of area A") of a surface on a side where a magnetic layer is formed with a thickness of 4.1 m is a value shown in Table 1, by applying and drying the non-magnetic layer forming composition prepared in the section (5) so that a thickness after the drying is 0.7 μm. Then, the magnetic layer forming composition prepared in the section (5) was applied onto the non-magnetic layer so that the thickness after the drying is 0.1 μm, and a coating layer was formed. After that, a homeotropic alignment process was performed by applying a magnetic field having a magnetic field strength of 0.3 T in a vertical direction with respect to a surface of a coating layer, while the coating layer of the magnetic layer forming composition is not dried. Then, the drying was performed to form the magnetic layer. After that, the back coating layer forming composition prepared in the section (5) was applied to the surface of the support on a side opposite to the surface where the non-magnetic layer and the magnetic layer were formed, so that the thickness after the drying becomes 0.3 μm, and was dried to form a back coating layer.

After that, a surface smoothing treatment (calender process) was performed by using a calender roll configured of only a metal roll, at a speed of 100 m/min, linear pressure of 300 kg/cm), and a calender temperature (surface temperature of a calender roll) of 90° C.

Then, the heat treatment was performed by storing the long magnetic tape raw material in a heat treatment furnace at the atmosphere temperature of 70° C. (heat treatment time: 36 hours). After the heat treatment, the magnetic tape was obtained by slitting to have a width of ½ inches.

After that, the magnetic tape (length of 970 m) was wound around the core for heat treatment, and the heat treatment was performed in a state of being wound around this core. As the core for heat treatment, a solid core member (outer diameter: 50 mm) formed of a resin and having 0.8 GPa of a bending elastic modulus was used, and the tension in a case of the winding was set as 0.6 N. The heat treatment was performed at the heat treatment temperature of 50° C. for 5 hours. The weight absolute humidity in the atmosphere in which the heat treatment was performed was 10 g/kg Dry air.

After the heat treatment, the magnetic tape and the core for heat treatment are sufficiently cooled, the magnetic tape is removed from the core for heat treatment, the winding core is wound around the core for temporary winding, and then another reel (from the core for temporary winding) is used. The magnetic tape for the final length (960 m) was wound around the reel outer diameter (44 mm), and the remaining 10 μm was cut off. As the core for temporary winding, a solid core member having the same outer diameter and formed of the same material as the core for heat treatment was used, and the tension at the time of winding was set as 0.6 N.

<Manufacturing of Magnetic Tape for Area B>
(1) Magnetic Layer Forming Composition List
Ferromagnetic powder (see Table 1): 100.0 parts
Vinyl chloride copolymer (MR 110 manufactured by Kaneka Corporation): 10.0 parts
($SO_3Na$ group: $5\times10^{-6}$ eq/g, degree of polymerization: 350, epoxy group: 3.5% by mass in monomer unit)
Polyester polyurethane resin: 10.0 parts
(Neopentyl glycol/caprolactone polyol/4,4'-diphenylmethanediisocyanate (MDI)=0.9/2.6/1 (mass ratio)),
($SO_3Na$ group: $1\times10^{-4}$ eq/g)
α-alumina (Average particle size: see Table 1): 10.0 parts
Carbon black (average particle size: 0.10 m): 1.0 part
Stearic acid: 1.0 part
Stearic acid amide: 0.3 parts
Butyl stearate: 3.0 parts
Methyl ethyl ketone: 150.0 parts
Cyclohexanone: 50.0 parts
Toluene: 40.0 parts (2) Non-Magnetic Layer Forming Composition List
Carbon black: 100.0 parts
DBP oil absorption: 74 $cm^3$/100 g
Nitrocellulose: 27.0 parts
Polyester polyurethane resin including sulfonic acid group and/or salt thereof: 62.0 parts
Polyester resin: 4.0 parts
Alumina powder (BET specific surface area: 17 $m^2$/g): 0.6 parts
Stearic acid: see Table 1
Stearic acid amide: see Table 1
Butyl stearate: see Table 1
Methyl ethyl ketone: 600.0 parts
Toluene: 600.0 parts
Polyisocyanate (CORONATE (registered product) L manufactured by Tosoh Corporation): 15.0 parts (3) Upper Back Coating Layer Forming Composition List
Carbon black: 100.0 parts
DBP oil absorption: 74 $cm^3$/100 g
Nitrocellulose: see Table 1
Polyurethane resin (polyester polyurethane resin including sulfonic acid group and/or salt thereof): see Table 1
Polyester resin: 4.0 parts
Alumina powder (BET specific surface area: 17 $m^2$/g): 0.6 parts
Methyl ethyl ketone: 600.0 parts
Toluene: 600.0 parts
Polyisocyanate (CORONATE (registered product) L manufactured by Tosoh Corporation): 15.0 parts (4) Lower Back Coating Layer Forming Composition List
Carbon black: 100.0 parts
DBP oil absorption: 74 $cm^3$/100 g
Nitrocellulose: 27.0 parts
Polyurethane resin (polyester polyurethane resin including sulfonic acid group and/or salt thereof): 62.0 parts
Polyester resin: 4.0 parts
Alumina powder (BET specific surface area: 17 $m^2$/g): 0.6 parts
Methyl ethyl ketone: 600.0 parts
Toluene: 600.0 parts
Polyisocyanate (CORONATE (registered product) L manufactured by Tosoh Corporation): 15.0 parts (5) Preparation of Each Layer Forming Composition Each component of each of the magnetic layer forming composition and the non-magnetic layer forming composition was kneaded with a continuous kneader and then dispersed with a sand mill. 5.0 parts of polyisocyanate (Coronate L manufactured by Tosoh Corporation) was added to each of the obtained dispersion liquids, 40.0 parts of methyl ethyl ketone was further added to each of the obtained dispersion liquids, and the mixture was filtered using a filter having a pore size of 1 μm to form a composition for forming a magnetic layer. A substance and a composition for forming a non-magnetic layer were prepared.

For the upper back coating layer forming composition, the components excluding polyisocyanate were introduced in a dissolver stirrer and stirred at a circumferential speed of 10 m/sec for 30 minutes, and the dispersion process was performed with a transverse beads mill disperser. After that, polyisocyanate was added, and stirred and mixed with a dissolver stirrer, and an upper back coating layer forming composition was prepared.

Regarding the lower back coating layer forming composition, the above components were kneaded with a continuous kneader and then dispersed using a sand mill. After adding 40.0 parts of polyisocyanate (Coronate L manufactured by Nippon Polyurethane Industry Co., Ltd.) and 1,000.0 parts of methyl ethyl ketone to the obtained dispersion liquid, the mixture was filtered using a filter having a hole diameter of 1 μm to prepare a lower back coating layer forming composition.

(6) Manufacturing of Magnetic Tape

A non-magnetic layer forming composition and a magnetic layer forming composition were applied at the same time in a multi-layered manner on a surface of a biaxially stretched polyethylene terephthalate support in which a thickness is 4.0 μm and a center line average surface roughness Ra (in Table 1, "support surface Ra of area B") of a surface on a side where the magnetic layer is formed, so that a thickness of the non-magnetic layer after drying is 2.0 m and a thickness of the magnetic layer after drying is 0.1 μm. After that, a homeotropic alignment process was performed by applying a magnetic field having a magnetic field strength of 0.3 T in a vertical direction with respect to a surface of a coating layer, while the coating layer of the magnetic layer forming composition is not dried, then, the drying was performed. In this way, the non-magnetic layer and the magnetic layer were formed. After that, the upper back coating layer forming composition and the lower back coating layer forming composition were applied to a surface of the support on a side opposite to the surface where the non-magnetic layer and the magnetic layer were formed, at the same time in a multi-layered manner so that the thickness after the drying is a thickness shown in Table 1, and then were dried. In this way, the upper back coating layer and the lower back coating layer were formed.

<Manufacture of Magnetic Tape Including Area A and Area B>

I 3 shows an example of disposition of an area A and an area B in a magnetic tape.

Figure 3:
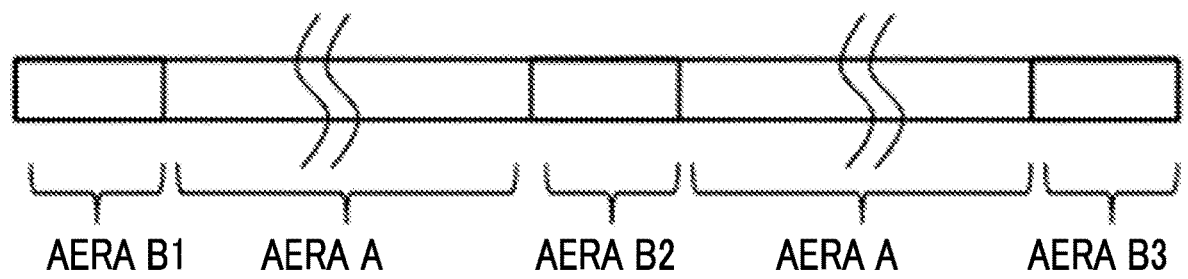
FIG. 3 shows an example of disposition of an area A and an area B in a magnetic tape.

As shown in FIG. 3, a magnetic tape was prepared in which the area A and the area B were continuously positioned.

Three tape pieces were cut out from the magnetic tape for the area B, and these were used as an area B1, an area B2, and an area B3, respectively.

Two of tape pieces having the same length were cut out from the magnetic tape for the area A, one was disposed as the area A between the areas B1 and B2, and the other one was disposed as the area A between the areas B2 and B3.

The area A and the area B were bonded by a splicing tape on the back coating layer side.

By recording a servo signal on a magnetic layer of the obtained magnetic tape with a commercially available servo writer, the magnetic tape including a data band, a servo band, and a guide band in the disposition according to a linear-tape-open (LTO) Ultrium format, and including a servo pattern (timing-based servo pattern) having the disposition and shape according to the LTO Ultrium format on the servo band was obtained. The servo pattern formed by doing so is a servo pattern disclosed in Japanese Industrial Standards (JIS) X6175:2006 and Standard ECMA-319 (June 2001). The total number of servo bands is five, and the total number of data bands is four.

The magnetic tape after forming the servo pattern as described above was wound around a tape reel (reel inner diameter: 44.0 mm, reel outer diameter: 96.8 mm) taken out from the magnetic tape cartridge (LTO Ultrium 7 data cartridge) such that the area B3 is located inside and the area B1 is located outside.

Examples 2 to 23 and Comparative Examples 1 to 10

A magnetic tape cartridge containing the magnetic tape was manufactured in the same manner as in Example 1, except that various items were changed as shown in a table described below.

In Table 2, in the column of "Area A length", for a magnetic tape having a plurality of areas A, the total length of the plurality of areas A is shown.

In Examples and Comparative Examples in which "3" is described in the column of "Number of areas B" in Table 2, the areas A and B were arranged in the same manner as in Example 1.

In the embodiment in which "1" is described in the column of "number of areas B" in Table 2, the magnetic tape was accommodated in the magnetic tape cartridge so that one area A and one area B are provided and the area A is located on the outside and the area B is located on the inside.

In the embodiment in which "2" is described in the column of "number of areas B" in Table 2, "area B1/area A/area B2" in the arrangement example in FIG. 3 was provided, and other areas (area B3 and the area A between the area B2 and the area B3) was not provided, and the magnetic tape was wound around a tape reel such that the area B2 is located on the inside and the area B1 is located on the outside.

In Comparative Example in which "0" is described in the column of "Number of areas B" in Table 2, only the magnetic tape for the area A was wound around a tape reel.

For each magnetic tape, the area ratio of the area B was calculated as "$(S_B/(S_A+S_B))\times 100$" from the lengths of the areas A and B and the tape width (½ inches) of the magnetic tape.

For the tape sample cut out from the magnetic tape for each area A and the tape sample cut out from the magnetic tape for the area B in Examples and Comparative Examples, an anisotropic magnetic field Hk was obtained by the method described above using TM-VSM5050-SMS (manufactured by TAMAKAWA CO., LTD.) type as a vibrating sample magnetometer, and the anisotropic magnetic field Hk was 25 kOe in Example 21, 30 kOe in Example 23, and in the range of 10 to 20 kOe in other examples and comparative examples.

In Table 1, "BaFe" in a column of the "ferromagnetic powder" is a hexagonal barium ferrite powder having an average particle size (average plate diameter) of 21 nm.

In Table 1, "SrFe1" of the column of "ferromagnetic powder" indicates a hexagonal strontium ferrite powder produced as follows.

1,707 g of $SrCO_3$, 687 g of $H_3BO_3$, 1,120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture.

The obtained raw material mixture was dissolved in a platinum crucible at a melting temperature of 1,390° C., and a tap hole provided on the bottom of the platinum crucible was heated while stirring the melt, and the melt was tapped in a rod shape at approximately 6 g/sec. The tap liquid was rolled and cooled with a water cooling twin roller to prepare an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 18 nm, an activation volume was 902 $nm^3$, an anisotropy constant Ku was $2.2\times 10^5$ $J/m^3$, and a mass magnetization as was 49 $A\times m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface layer portion content of the neodymium atom was 8.0 atom %. A ratio of the surface layer portion content and the bulk content, "surface layer portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the conditions of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degree In Table 1, "SrFe2" of the column of "ferromagnetic powder" indicates a hexagonal strontium ferrite powder produced as follows.

1,725 g of $SrCO_3$, 666 g of $H_3BO_3$, 1,332 g of $Fe_2O_3$, 52 g of $Al(OH)_3$, 34 g of $CaCO_3$, and 141 g of $BaCO_3$ were weighed and mixed in a mixer to obtain a raw material mixture.

The obtained raw material mixture was dissolved in a platinum crucible at a melting temperature of 1,380° C., and a tap hole provided on the bottom of the platinum crucible was heated while stirring the melt, and the melt was tapped in a rod shape at approximately 6 g/sec. The tap liquid was rolled and cooled with a water cooling twin roller to prepare an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 19 nm, an activation volume was 1,102 $nm^3$, an anisotropy constant Ku was $2.0\times10^5$ $J/m^3$, and a mass magnetization σs was 50 A×$m^2$/kg.

In Table 1, "ε-iron oxide" of the column of ferromagnetic powder indicates a ε-iron oxide powder produced as follows.

4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid aqueous solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1,000° C. was filled with the obtained precursor of ferromagnetic powder in the atmosphere and subjected to heat treatment for 4 hours.

The heat-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the heat-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide (ε-$Ga_{0.28}Co_{0.05}Ti_{0.05}Fe_{1.62}O_3$) was obtained. In addition, the X-ray diffraction analysis was performed under the same conditions as the conditions described regarding the hexagonal strontium ferrite powder SrFe1 in advance, and it was confirmed that the obtained ferromagnetic powder has a crystal structure of a single phase which is an F phase not including a crystal structure of an a phase and a y phase (s-iron oxide type crystal structure) from the peak of the X-ray diffraction pattern.

Regarding the obtained (s-iron oxide powder, an average particle size was 12 nm, an activation volume was 746 $nm^3$, an anisotropy constant Ku was $1.2 \times 10^5$ J/m$^3$, and a mass magnetization as was 16 A×m$^2$/kg.

The activation volume and the anisotropy constant Ku of the hexagonal strontium ferrite powder and the ε-iron oxide powder are values obtained by the method described above regarding each ferromagnetic powder by using an oscillation sample type magnetic-flux meter (manufactured by Toei Industry Co., Ltd.).

In addition, the mass magnetization as is a value measured at the magnetic field strength of 1,194 kA/m (15 kOe) by using an oscillation sample type magnetic-flux meter (manufactured by Toei Industry Co., Ltd.).

[Evaluation of Physical Properties of Magnetic Tape]

For Examples and Comparative Examples, a tape sample cut out from the magnetic tape for area A and a tape sample cut out from the magnetic tape for area B can be used for various measurements. Therefore, in accordance with the above description regarding the case where the magnetic tape for area A and the magnetic tape for area B are available, Examples and Comparative Examples use the magnetic tape for area A and the tape sample cut out from the magnetic tape for area B. The following physical property evaluations were carried out in order to obtain various physical property values for each of the magnetic tapes of the above.

<Magnetic Layer Surface Ra in Area a, Magnetic Layer Surface Ra in Area B>

A region of a randomly selected area of 40 μm×40 μm on the surface of the magnetic layer of each tape sample was measured using AFM (Nanoscope4 manufactured by Veeco) in a tapping mode to determine a center line average surface roughness Ra. RTESP-300 manufactured by BRUKER is used as a probe, a resolution is set as 512 pixels×512 pixels, and a scan speed is set by the measurement regarding 1 screen (512 pixels×512 pixels) for 341 seconds.

<Ratio $B_{Mag}/A_{Mag}$, Ratio $B_{Mag}/B_{Back}$>

Using each tape sample, the lubricant extraction amounts $A_{MAG}$, $B_{Mag}$, and $B_{Back}$ were determined by the method described above. From the obtained values, the ratio $B_{Mag}/A_{Mag}$ and the ratio $B_{Mag}/B_{Back}$ were calculated.

<Steel Ball Wear Volume Measured on the Surface of Magnetic Layer in Area B>

Using a tape sample cut out from the magnetic tape for the area B, the steel ball wear volume was measured on the surface of the magnetic layer by the method described above.

Regarding various physical property values of the magnetic tapes of Examples and Comparative Examples, in a case where a plurality of areas A are included in one magnetic tape, all the various physical property values of the plurality of areas A can be considered as the same value as the value obtained by using the tape sample. In a case where the plurality of areas B are included in one magnetic tape, various physical property values of the plurality of areas B can be considered as the same value as the value obtained by using the tape sample.

[Evaluation of electromagnetic conversion characteristics in repeated running in high temperature environment]

In an environment where the atmosphere temperature was 60° C.±1° C. and the relative humidity was 10%, the tape reel, around which the magnetic tape was wound as described above, was attached to a ½ inch-reel tester, which fixed a recording and reproducing head mounted on the LTO8 tape drive manufactured by IBM Co., Ltd, and the data recording and reproducing were performed by setting a relative speed between the magnetic head and the magnetic tape in a case of performing the recording and the reproducing to 4 m/sec.

The recording was performed at a line recording density of 300 kfci, a reproduction output in a case of reproduction was measured, and an SNR was obtained as a signal-to-noise ratio (ratio of a reproduction output to noise). In addition, the unit kfci is a unit of linear recording density (not convertible to SI unit system).

A difference between the SNR in a case where the recording and reproducing were performed for the first running pass and the SNR in a case where the recording and reproducing were performed for the 10,000th running pass was calculated. A case in which the SNR for the 10,000th running pass was reduced by more than 5.d dB, by compared to the SNR for the first running pass was determined as NG. The SNR was measured in Area A.

In Comparative Example 7 and Comparative Example 8, the magnetic head was attached to the surface of the magnetic layer during repeated running and the running was stopped, and accordingly, the SNR for the 10,000th running pass was not obtained (in Table 2, shown as "stop bonding"). Therefore, Comparative Example 7 and Comparative Example 8 were also determined as NG.

In a case other than the above, the determination was OK.

The above results are shown in Table 1 (Table 1-1 to Table 1-3) and Table 2 (Table 2-1 to Table 2-3).

TABLE 1-1

|  | Example 1 | Example 2 | Example 3 | Example 4 | Example 5 | Example 6 | Example 7 | Example 8 |
| --- | --- | --- | --- | --- | --- | --- | --- | --- |
| Ferromagnetic powder | BaFe | BaFe | BaFe | BaFe | BaFe | BaFe | BaFe | BaFe |
| Non-magnetic layer forming composition in area A |  |  |  |  |  |  |  |  |
| Stearic acid [parts] | 1.0 | 1.0 | 1.0 | 1.0 | 1.0 | 1.0 | 1.0 | 1.0 |
| Stearic acid amide [parts] | 0.3 | 0.3 | 0.3 | 0.3 | 0.3 | 0.3 | 0.3 | 0.3 |
| Butyl stearate [parts] | 3.0 | 3.0 | 3.0 | 3.0 | 3.0 | 3.0 | 3.0 | 3.0 |
| α-alumina average particle size of magnetic layer forming composition in area B [μm] | 0.20 | 0.20 | 0.20 | 0.20 | 0.20 | 0.20 | 0.20 | 0.20 |
| Non-magnetic layer forming composition in area B |  |  |  |  |  |  |  |  |
| Stearic acid [parts] | 1.5 | 0.7 | 5.8 | 1.1 | 2.9 | 2.0 | 1.6 | 1.4 |
| Stearic acid amide [parts] | 0.3 | 0.1 | 1.2 | 0.2 | 0.6 | 0.4 | 0.3 | 0.3 |
| Butyl stearate [parts] | 2.0 | 1.0 | 7.7 | 1.5 | 3.9 | 2.7 | 2.1 | 1.9 |
| Support surface Ra of area A [nm] | 2.3 | 2.4 | 2.3 | 2.3 | 2.0 | 2.2 | 2.3 | 2.0 |

TABLE 1-1-continued

| | | | | | | | | |
|---|---|---|---|---|---|---|---|---|
| Support surface Ra of area B [nm] | 8.0 | 8.0 | 8.0 | 2.0 | 8.0 | 8.0 | 8.0 | 8.0 |
| Lower back coating layer thickness [μm] | 0.2 | 0.2 | 0.2 | 0.2 | 0.2 | 0.2 | 0.2 | 0.2 |
| Upper back coating layer thickness [μm] | 0.1 | 0.1 | 0.1 | 0.1 | 0.1 | 0.1 | 0.1 | 0.1 |
| Upper back coating layer forming composition | | | | | | | | |
| Nitrocellulose [parts] | 50 | 50 | 50 | 50 | 50 | 35 | 40 | 75 |
| Polyurethane resin amount [parts] | 100 | 100 | 100 | 100 | 100 | 70 | 80 | 150 |

| | Example 9 | Example 10 | Example 11 | Example 12 | Example 13 | Example 14 |
|---|---|---|---|---|---|---|
| Ferromagnetic powder | BaFe | BaFe | BaFe | BaFe | BaFe | BaFe |
| Non-magnetic layer forming composition in area A | | | | | | |
| Stearic acid [parts] | 1.0 | 1.0 | 1.0 | 1.0 | 1.0 | 1.0 |
| Stearic acid amide [parts] | 0.3 | 0.3 | 0.3 | 0.3 | 0.3 | 0.3 |
| Butyl stearate [parts] | 3.0 | 3.0 | 3.0 | 3.0 | 3.0 | 3.0 |
| α-alumina average particle size of magnetic layer forming composition in area B [μm] | 0.20 | 0.20 | 0.11 | 0.38 | 0.15 | 0.30 |
| Non-magnetic layer forming composition in area B | | | | | | |
| Stearic acid [parts] | 1.5 | 1.5 | 1.5 | 1.5 | 1.5 | 1.5 |
| Stearic acid amide [parts] | 0.3 | 0.3 | 0.3 | 0.3 | 0.3 | 0.3 |
| Butyl stearate [parts] | 2.0 | 2.0 | 2.0 | 2.0 | 2.0 | 2.0 |
| Support surface Ra of area A [nm] | 2.4 | 2.5 | 2.3 | 2.0 | 2.2 | 2.3 |
| Support surface Ra of area B [nm] | 3.1 | 12.9 | 8.0 | 8.0 | 8.0 | 8.0 |
| Lower back coating layer thickness [μm] | 0.2 | 0.2 | 0.2 | 0.2 | 0.2 | 0.2 |
| Upper back coating layer thickness [μm] | 0.1 | 0.1 | 0.1 | 0.1 | 0.1 | 0.1 |
| Upper back coating layer forming composition | | | | | | |
| Nitrocellulose [parts] | 50 | 50 | 50 | 50 | 50 | 50 |
| Polyurethane resin amount [parts] | 100 | 100 | 100 | 100 | 100 | 100 |

TABLE 1-2

| | Example 15 | Example 16 | Example 17 | Example 18 | Example 19 | Example 20 | Example 21 | Example 22 | Example 23 |
|---|---|---|---|---|---|---|---|---|---|
| Ferromagnetic powder | BaFe | BaFe | BaFe | BaFe | BaFe | BaFe | SrFe1 | SrFe2 | ε-iron oxide |
| Non-magnetic layer forming composition in area A | | | | | | | | | |
| Stearic acid [parts] | 1.0 | 1.0 | 1.0 | 1.0 | 1.0 | 1.0 | 1.0 | 1.0 | 1.0 |
| Stearic acid amide [parts] | 0.3 | 0.3 | 0.3 | 0.3 | 0.3 | 0.3 | 0.3 | 0.3 | 0.3 |
| Butyl stearate [parts] | 3.0 | 3.0 | 3.0 | 3.0 | 3.0 | 3.0 | 3.0 | 3.0 | 3.0 |
| α-alumina average particle size of magnetic layer forming composition in area B [μm] | 0.20 | 0.20 | 0.20 | 0.20 | 0.20 | 0.20 | 0.20 | 0.20 | 9.20 |
| Non-magnetic layer forming composition in area B | | | | | | | | | |
| Stearic acid [parts] | 1.5 | 1.5 | 1.5 | 1.5 | 1.5 | 1.5 | 1.5 | 1.5 | 1.5 |
| Stearic acid amide [parts] | 0.3 | 0.3 | 0.3 | 0.3 | 0.3 | 0.3 | 0.3 | 0.3 | 0.3 |
| Butyl stearate [parts] | 2.0 | 2.0 | 2.0 | 2.0 | 2.0 | 2.0 | 2.0 | 2.0 | 2.0 |
| Support surface Ra of area A [nm] | 2.3 | 2.3 | 2.3 | 2.3 | 2.3 | 2.3 | 2.0 | 2.2 | 2.0 |
| Support surface Ra of area B [nm] | 8.0 | 8.0 | 8.0 | 8.0 | 8.0 | 8.0 | 8.0 | 8.0 | 8.0 |
| Lower back coating layer thickness [μm] | 0.2 | 0.2 | 0.2 | 0.2 | 0.2 | 0.2 | 0.2 | 0.2 | 0.2 |
| Upper back coating layer thickness [μm] | 0.1 | 0.1 | 0.1 | 0.1 | 0.1 | 0.1 | 0.1 | 0.1 | 0.1 |
| Upper back coating layer forming composition | | | | | | | | | |
| Nitrocellulose [parts] | 50 | 50 | 50 | 50 | 50 | 50 | 50 | 50 | 50 |
| Polyurethane resin amount [parts] | 100 | 100 | 100 | 100 | 100 | 100 | 100 | 100 | 100 |

TABLE 1-3

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Ferromagnetic powder | BaFe | BaFe | BaFe | BaFe | BaFe | BaFe | BaFe | BaFe | BaFe | BaFe |
| Non-magnetic layer forming composition in area A | | | | | | | | | | |
| Stearic acid [parts] | 0.7 | 1.3 | 3.2 | 1.0 | 1.0 | 1.0 | 1.0 | 1.0 | 1.0 | 1.0 |
| Stearic acid amide [parts] | 0.2 | 0.4 | 1.0 | 0.3 | 0.3 | 0.3 | 0.3 | 0.3 | 0.3 | 0.3 |
| Butyl stearate [parts] | 2.1 | 3.9 | 9.6 | 3.0 | 3.0 | 3.0 | 3.0 | 3.0 | 3.0 | 3.0 |
| α-alumina average particle size of magnetic layer forming composition in area B [μm] | — | — | — | 0.20 | 0.20 | 0.20 | 0.20 | 0.20 | 0.20 | 0.20 |
| Non-magnetic layer forming composition in area B | | | | | | | | | | |
| Stearic acid [parts] | — | — | — | 1.0 | 0.5 | 0.7 | 6.4 | 8.9 | 0.0 | 1.5 |
| Stearic acid amide [parts] | — | — | — | 0.2 | 0.1 | 0.1 | 1.3 | 1.8 | 0.0 | 0.3 |
| Butyl stearate [parts] | — | — | — | 1.3 | 0.6 | 0.9 | 8.5 | 11.8 | 0.0 | 2.0 |
| Support surface Ra of area A [nm] | 2.3 | 2.3 | 2.2 | 2.2 | 2.3 | 2.2 | 2.4 | 2.3 | 2.4 | 2.3 |
| Support surface Ra of area B [nm] | — | — | — | 8.0 | 8.0 | 8.0 | 8.0 | 8.0 | 8.0 | 18.5 |
| Lower back coating layer thickness [μm] | 0.5 | 0.5 | 0.5 | 0.5 | 0.5 | 0.2 | 0.2 | 0.2 | 0.5 | 0.2 |
| Upper back coating layer thickness [μm] | — | — | — | — | — | 0.1 | 0.1 | 0.1 | — | 0.1 |
| Upper back coating layer forming composition | | | | | | | | | | |
| Nitrocellulose [parts] | — | — | — | — | — | 50 | 50 | 50 | — | 50 |
| Polyurethane resin amount [parts] | — | — | — | — | — | 100 | 100 | 100 | — | 100 |

TABLE 2-1

|  | Example 1 | Example 2 | Example 3 | Example 4 | Example 5 | Example 6 | Example 7 | Example 8 |
|---|---|---|---|---|---|---|---|---|
| Ratio $B_{Mag}/A_{Mag}$ | 2.53 | 1.22 | 9.75 | 1.84 | 4.93 | 2.53 | 2.53 | 2.53 |
| Ratio $B_{Mag}/A_{back}$ | 10.3 | 10.4 | 9.7 | 10.1 | 9.9 | 2.1 | 7.1 | 21.0 |
| $A_{Mag}$ [mg/m$^2$] | 30.1 | 30.1 | 30.1 | 30.1 | 30.1 | 30.1 | 30.1 | 30.1 |
| $B_{Mag}$ [mg/m$^2$] | 76.2 | 36.7 | 293.5 | 55.4 | 148.4 | 76.2 | 77.0 | 76.2 |
| $B_{Mag}$ [mg/m$^2$] | 7.4 | 3.5 | 30.3 | 5.5 | 15.0 | 16.3 | 10.8 | 3.6 |
| Number of layers of back coating layers in area B | 2 layers | 2 layers | 2 layers | 2 layers | 2 layers | 2 layers | 2 layers | 2 layers |
| Magnetic layer surface Ra of area A [nm] | 1.8 | 1.9 | 1.8 | 1.8 | 1.6 | 1.7 | 1.8 | 1.6 |
| Magnetic layer surface Ra of area B [nm] | 4.1 | 4.1 | 4.1 | 4.1 | 4.1 | 3.9 | 4.2 | 4.3 |
| Steel ball wear volume of area B [mm$^2$] | $5 \times 10^{-6}$ | $6 \times 10^{-6}$ | $5 \times 10^{-6}$ | $6 \times 10^{-6}$ | $5 \times 10^{-6}$ | $5 \times 10^{-6}$ | $4 \times 10^{-6}$ | $5 \times 10^{-6}$ |
| Number of area B | 3 | 3 | 3 | 3 | 3 | 3 | 3 | 3 |
| Area ratio $(S_B/(S_A + S_B)) \times 100$ | 10.00% | 10.00% | 10.00% | 10.00% | 10.00% | 10.00% | 10.00% | 10.00% |
| Area A length [m] | 864 | 864 | 864 | 864 | 864 | 864 | 864 | 864 |
| Area B1 length [m] | 32 | 32 | 32 | 32 | 32 | 32 | 32 | 32 |
| Area B2 length [m] | 32 | 32 | 32 | 32 | 32 | 32 | 32 | 32 |
| Area B3 length [m] | 32 | 32 | 32 | 32 | 32 | 32 | 32 | 32 |
| SNR reduction [dB] | −0.1 | −3.0 | −3.3 | −1.1 | −1.2 | −2.8 | −1.1 | −0.2 |
| Determination | OK | OK | OK | OK | OK | OK | OK | OK |

|  | Example 9 | Example 10 | Example 11 | Example 12 | Example 13 | Example 14 |
|---|---|---|---|---|---|---|
| Ratio $B_{Mag}/A_{Mag}$ | 2.53 | 2.51 | 2.50 | 2.51 | 2.48 | 2.52 |
| Ratio $B_{Mag}/A_{back}$ | 9.9 | 10.5 | 9.9 | 10.2 | 10.2 | 10.0 |
| $A_{Mag}$ [mg/m$^2$] | 30.2 | 30.1 | 30.0 | 29.7 | 30.1 | 29.9 |
| $B_{Mag}$ [mg/m$^2$] | 76.4 | 75.6 | 75.0 | 74.5 | 74.6 | 75.3 |
| $B_{Mag}$ [mg/m$^2$] | 7.7 | 7.2 | 7.6 | 7.3 | 7.3 | 7.5 |
| Number of layers of back coating layers in area B | 2 layers | 2 layers | 2 layers | 2 layers | 2 layers | 2 layers |
| Magnetic layer surface Ra of area A [nm] | 1.9 | 2.0 | 1.8 | 1.6 | 1.7 | 1.8 |
| Magnetic layer surface Ra of area B [nm] | 2.6 | 7.8 | 3.7 | 4.5 | 3.8 | 4.6 |
| Steel ball wear volume of area B [mm$^2$] | $4 \times 10^{-6}$ | $6 \times 10^{-6}$ | $6 \times 10^{-6}$ | $5 \times 10^{-6}$ | $2 \times 10^{-6}$ | $8 \times 10^{-6}$ |
| Number of area B | 3 | 3 | 3 | 3 | 3 | 3 |
| Area ratio $(S_B/(S_A + S_B)) \times 100$ | 10.00% | 10.00% | 10.00% | 10.00% | 10.00% | 10.00% |
| Area A length [m] | 864 | 864 | 864 | 864 | 864 | 864 |
| Area B1 length [m] | 32 | 32 | 32 | 32 | 32 | 32 |
| Area B2 length [m] | 32 | 32 | 32 | 32 | 32 | 32 |

TABLE 2-1-continued

|  | | | | | | |
|---|---|---|---|---|---|---|
| Area B3 length [m] | 32 | 32 | 32 | 32 | 32 | 32 |
| SNR reduction [dB] | −1.0 | −1.1 | −3.1 | −3.1 | −1.2 | −1.0 |
| Determination | OK | OK | OK | OK | OK | OK |

TABLE 2-2

|  | Example 15 | Example 16 | Example 17 | Example 18 | Example 19 | Example 20 | Example 21 | Example 22 | Example 23 |
|---|---|---|---|---|---|---|---|---|---|
| Ratio $B_{Mag}/A_{Mag}$ | 2.53 | 2.53 | 2.53 | 2.53 | 2.53 | 2.53 | 2.50 | 2.49 | 2.52 |
| Ratio $B_{Mag}/A_{back}$ | 10.3 | 10.3 | 10.3 | 10.3 | 10.3 | 10.3 | 10.0 | 10.4 | 10.1 |
| $A_{Mag}$ [mg/m$^2$] | 30.1 | 30.1 | 30.1 | 30.1 | 30.1 | 30.1 | 30.0 | 30.6 | 30.2 |
| $B_{Mag}$ [mg/m$^2$] | 76.2 | 76.2 | 76.2 | 76.2 | 76.2 | 76.2 | 75.0 | 76.2 | 76.1 |
| $B_{Mag}$ [mg/m$^2$] | 7.4 | 7.4 | 7.4 | 7.4 | 7.4 | 7.4 | 7.5 | 7.3 | 7.5 |
| Number of layers of back coating layers in area B | 2 layers | 2 layers | 2 layers | 2 layers | 2 layers | 2 layers | 2 layers | 2 layers | 2 layers |
| Magnetic layer surface Ra of area A [nm] | 1.8 | 1.8 | 1.8 | 1.8 | 1.8 | 1.8 | 1.6 | 1.7 | 1.6 |
| Magnetic layer surface Ra of area B [nm] | 4.1 | 4.1 | 4.1 | 41 | 4.1 | 4.1 | 4.1 | 4.1 | 4.1 |
| Steel ball wear volume of area B [mm$^2$] | 5 × 10$^{-6}$ | 5 × 10$^{-6}$ | 5 × 10$^{-6}$ | 5 × 10$^{-6}$ | 5 × 10$^{-6}$ | 5 × 10$^{-6}$ | 5 × 10$^{-6}$ | 5 × 10$^{-6}$ | 5 × 10$^{-6}$ |
| Number of area B | 1 | 2 | 1 | 3 | 1 | 3 | 3 | 3 | 3 |
| Area ratio $(S_B/(S_A + S_B)) \times 100$ | 10.00% | 10.00% | 0.10% | 53.00% | 0.30% | 48.00% | 10.00% | 10.00% | 10.00% |
| Area A length [m] | 864 | 912 | 959 | 451 | 957 | 499 | 864 | 864 | 864 |
| Area B1 length [m] | 0 | 48 | 0 | 170 | 0 | 154 | 32 | 32 | 32 |
| Area B2 length [m] | 96 | 48 | 1 | 170 | 3 | 154 | 32 | 32 | 32 |
| Area B3 length [m] | 0 | 0 | 0 | 170 | 0 | 154 | 32 | 32 | 32 |
| SNR reduction [dB] | −3.9 | −1.2 | −3.7 | −2.4 | −1.4 | −1.2 | −0.1 | −0.1 | −0.2 |
| Determination | OK | OK | OK | OK | OK | OK | OK | OK | OK |

TABLE 2-3

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Ratio $B_{Mag}/A_{Mag}$ | 0.00 | 0.00 | 0.00 | 1.09 | 0.51 | 1.11 | 10.70 | 15.03 | 2.21 | 2.50 |
| Ratio $B_{Mag}/A_{back}$ | — | — | — | 1.6 | 1.4 | 9.6 | 9.6 | 11.0 | 1.5 | 10.2 |
| $A_{Mag}$ [mg/m$^2$] | 21.0 | 40.2 | 97.0 | 30.1 | 30.1 | 30.1 | 30.1 | 30.1 | 30.1 | 30.1 |
| $B_{Mag}$ [mg/m$^2$] | — | — | — | 32.8 | 15.4 | 33.4 | 322.1 | 452.4 | 66.5 | 75.3 |
| $B_{Mag}$ [mg/m$^2$] | — | — | — | 20.5 | 11.0 | 3.5 | 33.5 | 41.1 | 44.3 | 7.4 |
| Number of layers of back coating layers in area B | — | — | — | 1 Layer | 1 layer | 2 layers | 2 layers | 2 layers | 1 layer | 2 layers |
| Magnetic layer surface Ra of area A [nm] | 1.8 | 1.8 | 1.7 | 1.7 | 1.8 | 1.7 | 1.9 | 1.8 | 1.9 | 1.8 |
| Magnetic layer surface Ra of area B [nm] | — | — | — | 4.0 | 4.0 | 4.0 | 4.0 | 4.0 | 4.4 | 11.0 |
| Steel ball wear volume of area B [mm$^2$] | — | — | — | 7 × 10$^{-6}$ | 6 × 10$^{-6}$ | 3 × 10$^{-6}$ | 5 × 10$^{-6}$ | 5 × 10$^{-6}$ | 8 × 10$^{-6}$ | 4 × 10$^{-6}$ |
| Number of area B | 0 | 0 | 0 | 3 | 3 | 3 | 3 | 3 | 3 | 3 |
| Area ratio $(S_B/(S_A + S_B)) \times 100$ | 0% | 0% | 0% | 10% | 10% | 10% | 10% | 10% | 10% | 10.00% |
| Area A length [m] |  |  |  |  |  |  |  |  |  |  |
| Area A length [m] | 960 | 960 | 960 | 864 | 864 | 864 | 864 | 864 | 864 | 864 |
| Area B1 length [m] | 0 | 0 | 0 | 32 | 32 | 32 | 32 | 32 | 32 | 32 |
| Area B2 length [m] | 0 | 0 | 0 | 32 | 32 | 32 | 32 | 32 | 32 | 32 |
| Area B3 length [m] | 0 | 0 | 0 | 32 | 32 | 32 | 32 | 32 | 32 | 32 |
| SNR reduction [dB] | −10.5 | −9.3 | −9.9 | −6.4 | −7.5 | −5.5 | Stop bonding | Stop bonding | −5.6 | −5.9 |
| Determination | NG | NG | NG | NG | NG | NG | NG | NG | NG | NG |

From the results shown in Table 2, it can be confirmed that the magnetic tape of the example is a magnetic tape in which the electromagnetic conversion characteristics are hardly deteriorated even after repeated running in a severe high temperature environment.

One aspect of the invention is advantageous in a technical field of the magnetic tape for various data storages.

What is claimed is:

1. A magnetic tape comprising:
a non-magnetic support;
a magnetic layer including a ferromagnetic powder; and
a back coating layer containing a non-magnetic powder on a surface side of the non-magnetic support opposite to a surface side including the magnetic layer, wherein a region over a part of the magnetic tape in a longitudinal direction includes one or more areas A, a region over the other part of the magnetic tape includes one or more areas B, the area A is a region in which a center line average surface roughness Ra measured on a surface of the magnetic layer is 1.6 nm or higher and 2.0 nm or less, and the area B is a region in which the center line average surface roughness Ra measured on the surface of the magnetic layer is 2.5 nm to 10.0 nm, wherein extraction amounts per unit area of a component selected from the group consisting of fatty acid, fatty acid ester, and fatty acid amide extracted from a magnetic layer side of the area A and the area B are defined as $A_{Mag}$ and $B_{Mag}$, respectively, and a ratio $B_{Mag}/A_{Mag}$ is 1.20 to 10.00, and wherein an extraction amount per unit area of a component selected from the group consisting of fatty acid, fatty acid ester, and fatty acid amide extracted from a back coating layer side of the area B is defined as $B_{Back}$, and a ratio $B_{Mag}/B_{Back}$ is equal to or greater than 2.0.

2. The magnetic tape according to claim 1, wherein the ratio $B_{Mag}/A_{Mag}$ is 1.80 or more and 5.00 or less.

3. The magnetic tape according to claim 1, wherein the ratio $B_{Mag}/B_{Back}$ is 7.0 or more.

4. The magnetic tape according to claim 1, wherein a steel ball wear volume of the area B measured on the surface of the magnetic layer is $1 \times 10^{-7}$ mm$^3$ or more and $1 \times 10^{-4}$ mm$^3$ or less, the steel ball wear volume being a value obtained in an environment where the atmosphere temperature is 23° C. and the relative humidity is 50%, and a steel ball having a diameter of 6.25 mm is slid on the surface of the magnetic layer in a state where a load of 10 g is applied to the steel ball.

5. The magnetic tape according to claim 1, wherein a ratio $(S_B/(S_A+S_B)) \times 100$ of $S_B$ to a total of $S_A$ and $S_B$ is 0.15% to 50.00%, where an area of the area A is defined as $S_A$ and an area of the area B is defined as $S_B$.

6. The magnetic tape according to claim 1, wherein two or more areas B are included.

7. The magnetic tape according to claim 1, further comprising:
a non-magnetic layer containing a non-magnetic powder between the non-magnetic support and the magnetic layer.

8. The magnetic tape according to claim 1, wherein a servo pattern is provided on at least a part of the magnetic layer.

9. The magnetic tape according to claim 8, wherein the servo pattern is provided on at least the magnetic layer in the area A.

10. The magnetic tape according to claim 9, wherein the servo pattern is further provided in the magnetic layer of the area B.

11. A magnetic tape cartridge comprising:
the magnetic tape according to claim 1.

12. A magnetic tape device comprising:
the magnetic tape according to claim 1; and
a magnetic head.

13. The magnetic tape device according to claim 12, wherein a region in which the magnetic head records data is included in at least the area A.

14. The magnetic tape device according to claim 13, wherein the magnetic tape device controls running conditions of the area B according to a measurement result regarding recording and reproducing quality of data in the area A.

15. The magnetic tape according to claim 1, wherein the area B is a region in which the center line average surface roughness Ra measured on the surface of the magnetic layer is 3.0 nm to 10.0 nm.

16. The magnetic tape according to claim 1, wherein the area B is a region in which the center line average surface roughness Ra measured on the surface of the magnetic layer is 4.1 nm to 10.0 nm.

* * * * *